(12) United States Patent
Lee et al.

(10) Patent No.: US 12,072,494 B2
(45) Date of Patent: Aug. 27, 2024

(54) DEVICE AND METHOD FOR DISPLAYING AUGMENTED REALITY

(71) Applicant: SAMSUNG ELECTRONICS CO., LTD., Suwon-si (KR)

(72) Inventors: Kyookeun Lee, Suwon-si (KR); Harry Edward Milton, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 321 days.

(21) Appl. No.: 17/338,181

(22) Filed: Jun. 3, 2021

(65) Prior Publication Data

US 2021/0389591 A1 Dec. 16, 2021

(30) Foreign Application Priority Data

Jun. 3, 2020 (KR) .................. 10-2020-0067317
Sep. 25, 2020 (KR) .................. 10-2020-0124748

(51) Int. Cl.
*G02B 27/01* (2006.01)
*F21V 8/00* (2006.01)
(Continued)

(52) U.S. Cl.
CPC ......... *G02B 27/0172* (2013.01); *G02B 6/003* (2013.01); *G02B 6/005* (2013.01);
(Continued)

(58) Field of Classification Search
None
See application file for complete search history.

(56) References Cited

U.S. PATENT DOCUMENTS 8,885,139 B2 11/2014 Peyghambarian et al.
9,927,614 B2 3/2018 Vallius
(Continued)

FOREIGN PATENT DOCUMENTS

KR 10-2007-0118594 A 12/2007
KR 10-2020-0136297 A 12/2020
(Continued)

OTHER PUBLICATIONS

Communication dated Sep. 6, 2021 issued by the International Searching Authority in counterpart Application No. PCT/KR2021/006876 (PCT/ISA/220, PCT/ISA/210, and PCT/ISA/237).

*Primary Examiner* — Shan Liu
(74) *Attorney, Agent, or Firm* — Sughrue Mion, PLLC

(57) ABSTRACT

Provided is a device for displaying augmented reality including an optical engine configured to output light of a virtual image, a waveguide configured to output light of the virtual image and transmit light of a real scene, a first lens part and a second lens part, and a processor, the first lens part being configured to tune a focus of the virtual image and including a first focus-tunable lens having a refractive power tunable by the processor and a fixed refractive lens having a refractive power, the second lens part being configured to compensate distortion of the real scene and including a second focus-tunable lens having a refractive power that is tunable by the processor, and the processor being further configured to determine the first refractive power based on vision information of the user, attribute depth information of the virtual image, and fixed refractive power of the fixed refractive lens.

18 Claims, 22 Drawing Sheets

(51) Int. Cl.
 *G02B 27/00* (2006.01)
 *G02C 7/08* (2006.01)
(52) U.S. Cl.
 CPC ......... *G02B 27/0093* (2013.01); *G02C 7/083* (2013.01); *G02B 2027/014* (2013.01); *G02B 2027/0178* (2013.01)

(56) References Cited

U.S. PATENT DOCUMENTS

| | | |
|---|---|---|
| 10,459,231 B2 | 10/2019 | Miller et al. |
| 2017/0160518 A1 | 6/2017 | Lanman et al. |
| 2018/0275367 A1 | 9/2018 | Lim |
| 2018/0275394 A1* | 9/2018 | Yeoh ................. G02B 27/0179 |
| 2018/0284464 A1* | 10/2018 | Lu .............................. G02F 1/29 |
| 2019/0129178 A1 | 5/2019 | Patterson et al. |
| 2020/0225477 A1* | 7/2020 | Chan ................... G02B 27/0176 |
| 2020/0301239 A1* | 9/2020 | Akkaya .............. G02B 27/0172 |
| 2020/0379214 A1 | 12/2020 | Lee et al. |
| 2021/0149197 A1* | 5/2021 | Yadin ..................... G02B 26/06 |

FOREIGN PATENT DOCUMENTS

| | | |
|---|---|---|
| WO | 2018/213010 A1 | 11/2018 |
| WO | 2019/012385 A1 | 1/2019 |

* cited by examiner

DEVICE AND METHOD FOR DISPLAYING AUGMENTED REALITY

CROSS-REFERENCE TO RELATED APPLICATIONS

This application is based on and claims priority under 35 U.S.C. § 119 to Korean Patent Application No. 10-2020-0067317, filed on Jun. 3, 2020 and Korean Patent Application No. 10-2020-0124748, filed on Sep. 25, 2020, in the Korean Intellectual Property Office, the disclosures of which are incorporated by reference herein in their entireties.

BACKGROUND

1. Field

The disclosure relates to a device and method for displaying augmented reality (AR), and more particularly, to a device for displaying AR, which includes a focus-tunable lens, and a method of displaying AR.

2. Description of Related Art

An augmented reality (AR) device enables a user to see AR, and may include, for example, AR glasses. An image optical system of the AR device may include an image generation device that generates an image and a waveguide that guides the generated image to eyes of a user.

An image output from the image generation device, for example, a projector, etc. may be radiated to the eyes through the waveguide, whereby a user may observe the image. In a display using the waveguide, a focal distance of a virtual image may be, for example, infinite, and thus, for an immersive AR environment, a means for positioning a focal distance of a virtual image to be an arbitrary distance where a real object is located is needed. Meanwhile, among users using an AR device, a user whose vision is corrected with glasses needs to use an additional means such as an optical clip. However, due to the inconvenience of the optical clip, an AR device having a vision correction function for people with low vision by using a focus-tunable lens is being studied.

SUMMARY

The disclosure provides an AR device configured to perform self-vision correction.

The disclosure also provides an immersive AR environment.

The disclosure further provides an AR environment in which a quality of a virtual image is improved.

Technical problems to be solved are not limited to the technical problems described above, and other technical problems may exist.

Additional aspects will be set forth in part in the description which follows and, in part, will be apparent from the description, or may be learned by practice of the presented embodiments of the disclosure.

According to an aspect of an example embodiment, there is provided a device for displaying augmented reality (AR), the device including an optical engine configured to output light of a virtual image, a waveguide configured to output the light of the virtual image received from the optical engine and transmit light of a real scene, a first lens part provided on a first surface of the waveguide, a second lens part provided on a second surface of the waveguide opposite to the first surface, and a processor, wherein the first lens part is configured to tune a focus of the virtual image and correct a user's vision, the first lens part including a first focus-tunable lens having a first refractive power that is tunable by the processor and a fixed refractive lens having a fixed refractive power, wherein the second lens part is configured to compensate distortion of the real scene caused by the first lens part, and the second lens part including a second focus-tunable lens having a second refractive power that is tunable by the processor, and wherein the processor is further configured to determine the first refractive power of the first focus-tunable lens based on vision information of the user, attribute depth information of the virtual image, and fixed refractive power information of the fixed refractive lens.

The first refractive power of the first focus-tunable lens may satisfy $$D_1 = -D_{fixed} + D_{correction} - \frac{1}{f},$$

where $D_1$ indicates the first refractive power of the first focus-tunable lens, $D_{fixed}$ indicates the fixed refractive power of the fixed refractive lens, $D_{correction}$ indicates a correction-required refractive power for correcting ametropia of the user, and $f$ indicates a focal distance of the virtual image.

The device may further include a memory configured to store the fixed refractive power $D_{fixed}$ of the fixed refractive lens, the correction-required refractive power $D_{correction}$ of the user, and the focal distance $f$ of the virtual image, wherein the processor is further configured to read the fixed refractive power of the fixed refractive lens, the correction-required refractive power of the user, and focal distance of the virtual image from the memory and obtain the first refractive power $D_1$ of the first focus-tunable lens as $$-D_{fixed} + D_{correction} - \frac{1}{f}.$$

The device may further include a memory configured to store the focal distance f of the virtual image and a modified correction-required refractive power $D_{modified}$ in which the fixed refractive power of the fixed refractive lens is reflected, wherein the modified correction-required refractive power $D_{modified}$ satisfies $D_{modified} = -D_{fixed} + D_{correction}$, and wherein the processor is further configured to read the modified correction-required refractive power and the focal distance of the virtual image from the memory and obtain the first refractive power $D_1$ of the first focus-tunable lens as $$D_{modified} - \frac{1}{f}.$$

A second refractive power $D_2$ of the second focus-tunable lens may satisfy $$D_2 = \frac{1}{f}.$$

The fixed refractive lens may be a concave lens having a negative (−) refractive power.

The first focus-tunable lens and the second focus-tunable lens may be liquid crystal lenses.

The second focus-tunable lens may be provided between the waveguide and the fixed refractive lens, and wherein the first focus-tunable lens, the waveguide, and the second focus-tunable lens may have a stack structure.

The device may further include a user input interface configured to receive at least any one of the vision information of the user or the focal distance of the virtual image based on a user input.

The first lens part may further include a polarization plate provided on an incident surface of the fixed refractive lens or an emission surface of the fixed refractive lens.

The second lens part may further include a second fixed refractive lens configured to compensate distortion of the real scene caused by the first lens part and the second focus-tunable lens.

The second fixed refractive lens may be a convex lens having a positive (+) refractive power.

The second refractive power $D_2$ of the second focus-tunable lens may satisfy $$D_2 = \frac{1}{f} - D_{fixed2},$$

where $D_{fixed2}$ indicates a fixed refractive power of the second fixed refractive lens.

The device may further include a gaze tracking sensor configured to obtain gaze information of the user.

The processor may be further configured to obtain a gaze point from the gaze information of the user obtained by the gaze tracking sensor, and determine the focal distance of the virtual image based on the obtained gaze point.

The processor may be further configured to control the optical engine to output at least one first character of a preset size, obtain at least one first user input with respect to the at least one first character, compare the at least one first character with the at least one first user input, determine the first refractive power of the first focus-tunable lens based on a result of the comparing, and determine the correction-required refractive power of the user based on the determined first refractive power of the first focus-tunable lens.

The at least one first character and at least one second character may have sizes corresponding to preset corrected vision, and the at least one first character and the at least one second character are displayed to a preset depth for vision measurement of the user.

The device may be a glasses-type device.

According to an aspect of another example embodiment, there is provided a method of displaying augmented reality (AR) in an AR device that includes an optical engine configured to output light of a virtual image and a waveguide configured to output the light of the virtual image and transmit light of a real scene, the method including providing a first lens part including a fixed refractive lens and a first focus-tunable lens and a second lens part including a second focus-tunable lens on opposite surfaces of the waveguide, obtaining a first refractive power of the first focus-tunable lens based on vision information of a user, focal distance of the virtual image, and a fixed refractive power of the fixed refractive lens, and obtaining a second refractive power of the second focus-tunable lens to compensate for distortion of the real scene caused by the first lens part.

The obtaining of the first refractive power of the first focus-tunable lens may include reading a fixed refractive power $D_{fixed}$ of the fixed refractive lens, a correction-required refractive power of the user, and the focal distance f of the virtual image from a memory, and obtaining a first refractive power $D_1$ of the first focus-tunable lens satisfying $$D1 = -D_{fixed} + D_{correction} - \frac{1}{f}.$$

According to an aspect of another example embodiment, there is provided a device for displaying augmented reality (AR), the device including an optical engine configured to output light of a virtual image, a waveguide configured to output the light of the virtual image received from the optical engine and transmit light of a real scene, a first lens part provided on a first surface of the waveguide, a second lens part provided on a second surface of the waveguide opposite to the first surface, a microphone configured to receive a voice input of the user, and a processor, wherein the first lens part is configured to tune a focus of the virtual image and correct a user's vision, the first lens part including a first focus-tunable lens having a first refractive power that is tunable by the processor and a fixed refractive lens having a fixed refractive power, wherein the second lens part is configured to compensate distortion of the real scene caused by the first lens part, and the second lens part including a second focus-tunable lens having a second refractive power that is tunable by the processor, and wherein the processor is further configured to determine the first refractive power of the first focus-tunable lens based on vision information of the user, attribute depth information of the virtual image, and fixed refractive power information of the fixed refractive lens.

The processor may be further configured to control the optical engine to output at least one first character of a preset size, obtain at least one first voice input received by the microphone with respect to the at least one first character, compare the at least one first character with the at least one first voice input, determine the first refractive power of the first focus-tunable lens based on a result of the comparing, and determine a correction-required refractive power of the user based on the determined first refractive power of the first focus-tunable lens.

The at least one first character may have a size corresponding to preset corrected vision, and the at least one first character may be displayed to a preset depth for vision measurement of the user.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
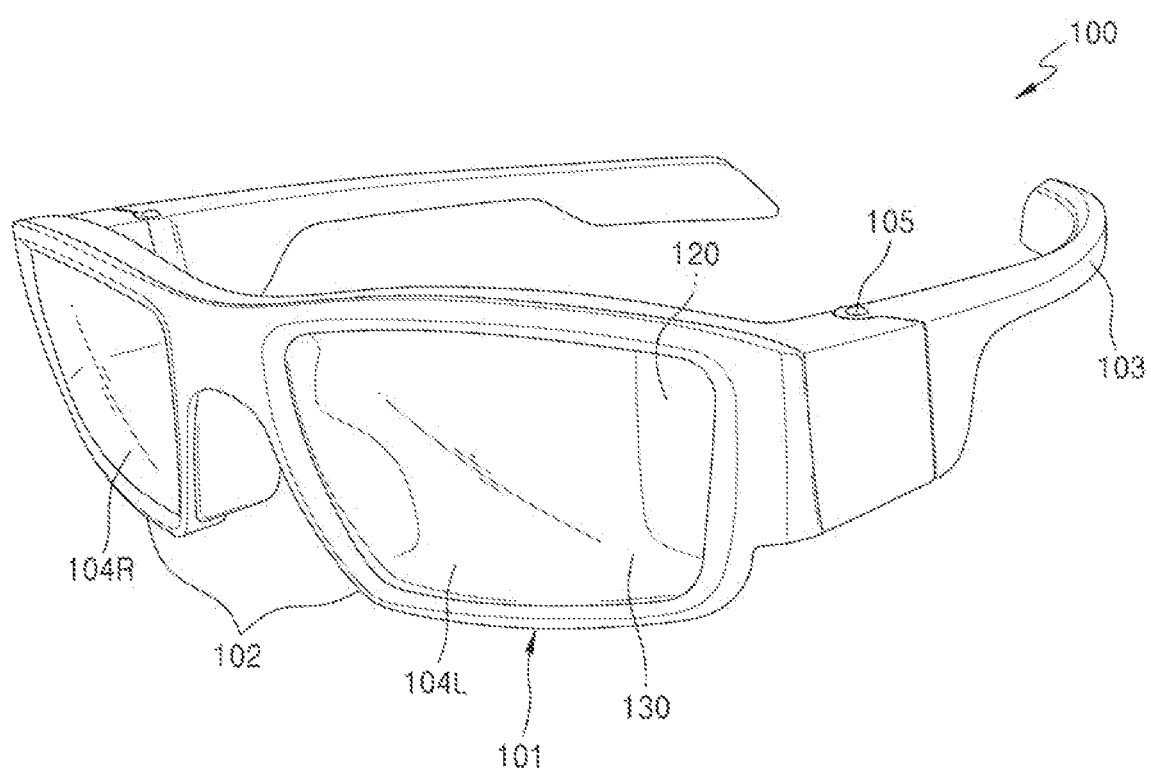
FIG. 1 illustrates an exterior of an augmented reality (AR) device according to an embodiment.

Hereinafter, embodiments of the disclosure will be described in detail with reference to the attached drawings to allow those of ordinary skill in the art to easily carry out the embodiments of the disclosure. However, the disclosure may be implemented in various forms, and are not limited to the embodiments of the disclosure described herein. To clearly describe the disclosure, parts that are not associated with the description have been omitted from the drawings, and throughout the specification, identical reference numerals refer to identical parts.

Throughout the disclosure, the expression "at least one of a, b or c" indicates only a, only b, only c, both a and b, both a and c, both b and c, all of a, b, and c, or variations thereof.

Although terms used in embodiments of the specification are selected with general terms popularly used at present under the consideration of functions in the disclosure, the terms may vary according to the intention of those of ordinary skill in the art, judicial precedents, or introduction of new technology. In addition, in a specific case, the applicant voluntarily may select terms, and in this case, the meaning of the terms is disclosed in a corresponding description part of the disclosure. Thus, the terms used in the specification should be defined not by the simple names of the terms but by the meaning of the terms and the contents throughout the disclosure.

In the disclosure, augmented reality (AR) may be displaying a virtual image by overlaying the virtual image on a physical environment space or a real object in a real world.

In the disclosure, an AR device may be a device capable of expressing 'AR', and may include not only AR glasses in the form of glasses worn on a facial part of a user, but also a head-mounted display (HMD) or an AR helmet, etc., worn on a head part of the user.

In the disclosure, a real scene may be a scene of the real world an observer or the user sees through the AR device, and may include real world object(s).

The virtual image may be an image generated through an optical engine. The virtual image may include both a static image and a dynamic image. The virtual image may be an image which is observed together with the real scene and shows information regarding the real object in the real scene or information or a control menu, etc., regarding an operation of the AR device. The 'virtual object' may be expressed as a partial region of the virtual image. The virtual object may indicate information related to a real object. The virtual object may include at least one of, for example, a character, a number, a sign, an icon, an image, or animation.

In the disclosure, a focus-tunable lens may be a lens in which a focal distance is tunable. As the focus-tunable lens, a liquid crystal (LC) lens, a liquid lens, or other well-known focus-tunable optical systems may be used. As described above, when the user sees the virtual image, a distance of the virtual image may be adjusted through the focus-tunable lens.

In the disclosure, a focus may be a point at which a straight line extending from light parallel to an optical axis of a lens meets an optical system after passing through the lens (or the optical system). On a principal plane of the lens (or the optical system), a distance to the focus in the air may be a focal distance.

In the disclosure, a refractive index may be a rate at which the speed of light is reduced in a medium in comparison to a vacuum.

In the disclosure, a refractive power may be a force that changes a direction of light or an optical path by a curved surface of the lens. The unit of the refractive power is $m^{-1}$ or a diopter (D), a value of which is expressed with a reciprocal number of a focal distance. The diopter is referred to as a power of the lens having a corresponding refractive power. The sign of the refractive power is positive (+) for a convex lens and negative (−) for a concave lens.

In the disclosure, visual acuity (VA) may be the spatial resolving ability of eyes, i.e., the ability of the eyes to identify fine details when a stationary object is seen with the eyes. Excessively high or low ametropia is a cause for myopia or hyperopia, which may be corrected with a means such as glasses, contact lenses, vision correction surgery, or the like. A corrected vision may be a measured a vision of a user wearing a lens having a certain refractive power. A correction-required refractive power means a refractive power required for achieving a corrected vision.

In the disclosure, a depth of a virtual image may be a distance or a position in which the user recognizes existence of the virtual image on a space when the user sees the virtual image. A 3D image using binocular disparity generates a left-eye virtual image and a right-eye virtual image in different gaze directions, and in this case, the different gaze directions may include a gaze direction with the left eye of the user and a gaze direction from with right eye of the user. Thus, the depth of the virtual image in the 3D image using binocular disparity may be a distance converted from disparity (i.e., binocular disparity) based on the gaze direction with the left eye and the gaze direction with the right eye.

In the disclosure, the gaze direction may be a direction in which the user gazes, and the 'gaze' may be a virtual line directed from a pupil of the user in the gaze direction. The gaze direction is calculated from information obtained mainly in the gaze tracking sensor to estimate the gaze.

In the disclosure, the gaze point may be a point at which the user gazes, and may be calculated as a point at which the gazes of both eyes of the user intersect. When the user sees the 3D image using binocular disparity, the user recognizes the 3D image based on the binocular disparity, the gaze point obtained through a convergent angle of the eyes of the user may be a point in which the user recognizes existence of the virtual object (i.e., the depth of the virtual image).

Hereinafter, the disclosure will be described with reference to the accompanying drawings.

Figure 2:
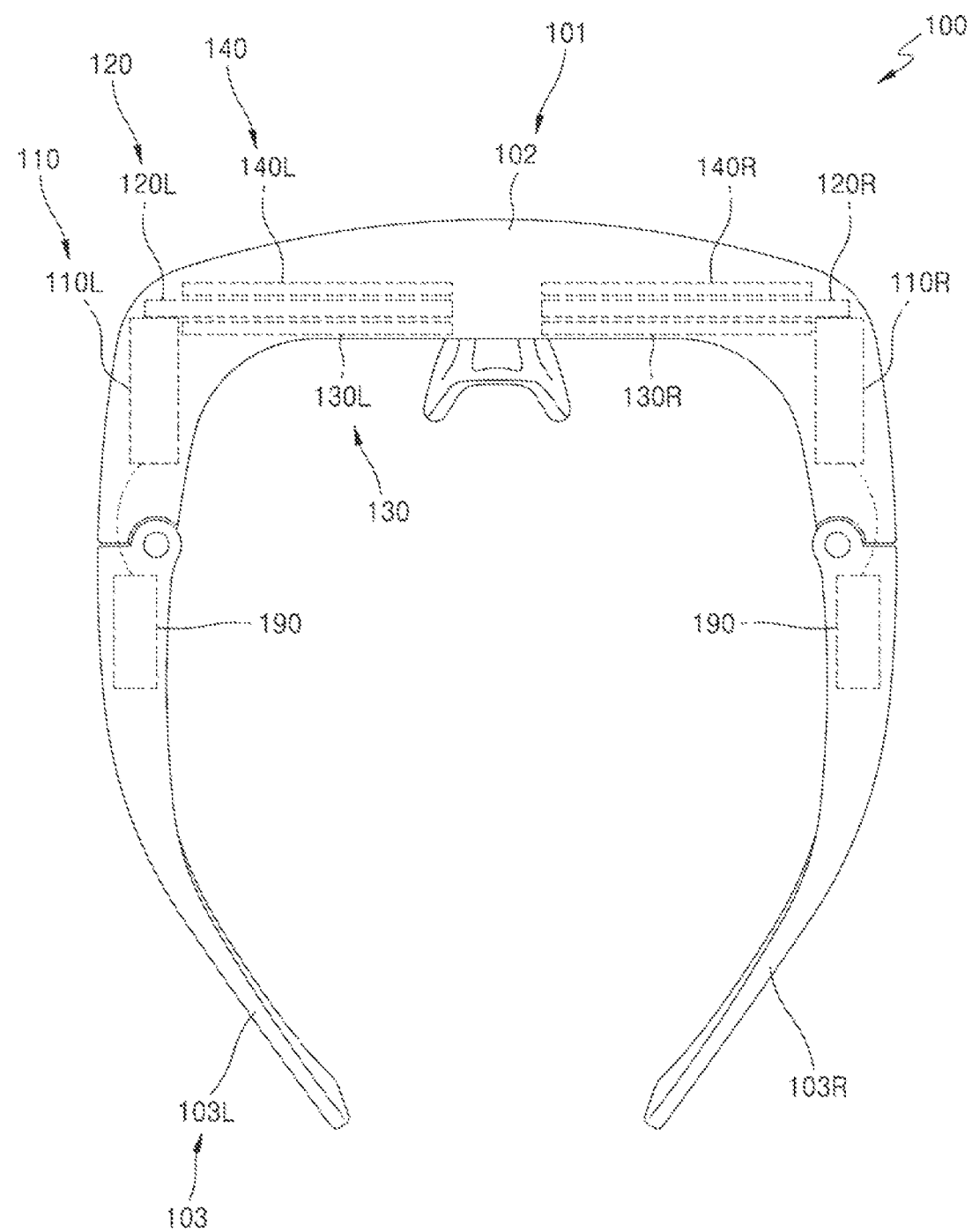
FIG. 2 is a plan view illustrating the AR device of FIG. 1.

FIG. 1 illustrates an exterior of an AR device 100 according to an embodiment, and FIG. 2 is a plane view of the AR device 100 of FIG. 1.

Referring to FIGS. 1 and 2, the AR device 100 according to the embodiment may be AR glasses configured to be worn by the user and may include a glasses-type body 101.

The glasses-type body 101 may include, for example, a frame 102 and temples 103. The frame 102 in which glass lenses 104L and 104R are positioned may have, for example, the shape of two rims connected by a bridge. The glass lenses 104L and 104R are examples, and may have or may not have a refractive power (a power). The glass lenses 104L and 104R may be formed integrally, and in this case, the rims of the frame 102 may not be distinguished from the bridge. The glass lenses 104L and 104R may be omitted.

The temples 103 may be respectively connected to both end portions of the frame 102 and extend in a direction. The frame 102 and the temples 103 may be connected by a hinge 105. The hinge 105 is an example, and the glasses-type body 101 may include a member connecting the frame 102 with the temples 103. In another example, the frame 102 and the temples 103 may be connected integrally or continuously.

In the glasses-type body 101, an optical engine 110, a waveguide 120, a first lens part 130, a second lens part 140, and electronic parts 190 may be arranged.

The optical engine 110 may be configured to generate light of the virtual image, and may be an optical engine of a projector, which includes an image panel, an illuminating optical system, a projecting optical system, etc. The optical engine 110 may include a left-eye optical engine 110L and a right-eye optical engine 110R. The left-eye optical engine 110L and the right-eye optical engine 110R may be positioned on both end portions of the frame 102. In another example, the left-eye optical engine 110L and the right-eye optical engine 110R may be respectively positioned in a left temple 103L and a right temple 103R.

The optical parts may be configured to deliver light of the virtual image generated in the optical engine 110 and light of a real scene to the pupils of the user, and may include the waveguide 120, the first lens part 130, and the second lens part 140. The optical parts may be arranged in the left side and the right side of the glasses-type body 101. Left-eye optical parts and right-eye optical parts may be arranged or attached in the left glass lens 104L and the right glass lens 104R. Alternatively, left-eye optical parts and right-eye optical parts may be mounted in the frame 102 separately from the glass lenses 104L and 104R. In another example, the left-eye optical parts and the right-eye optical parts may be formed integrally and mounted on the frame 102. In another example, the optical parts may be arranged in any one of the left side and the right side of the glasses-type body 101.

The electronic parts 190 may include a processor (170 of FIG. 4), a user input interface (150 of FIG. 4), and a memory (160 of FIG. 4), and may be positioned in any one of the frame 102 or the temples 103 of the glasses-type body 101 or distributed in a plurality of positions, and may be mounted on a printed circuit board (PCB), a flexible PCB (FPCB), etc. Although not shown, a first lens driving driver circuit that drives a first focus-tunable lens 131 may be arranged adjacent to the first focus-tunable lens 131. A second lens driving driver circuit that drives a second focus-tunable lens 141 may be arranged adjacent to a second focus-tunable lens 141. In another example, the first and second lens driving driver circuits may be completely or partially positioned on, for example, a main board.

Figure 3:
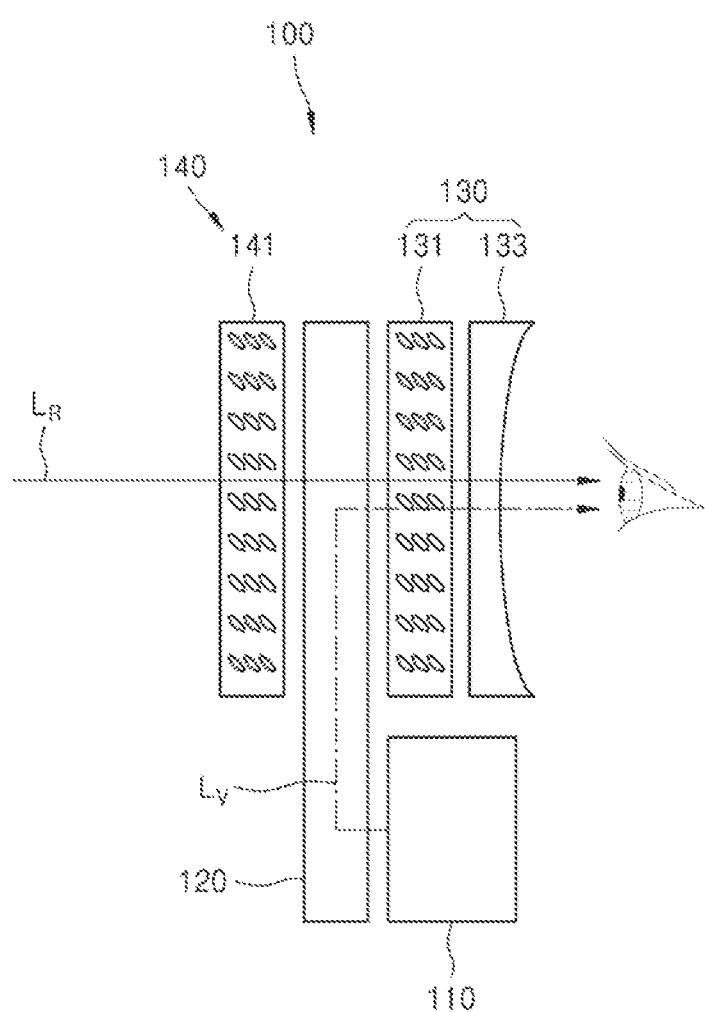
FIG. 3 illustrates arrangement of an optical engine and optical parts according to an embodiment.
Figure 4:
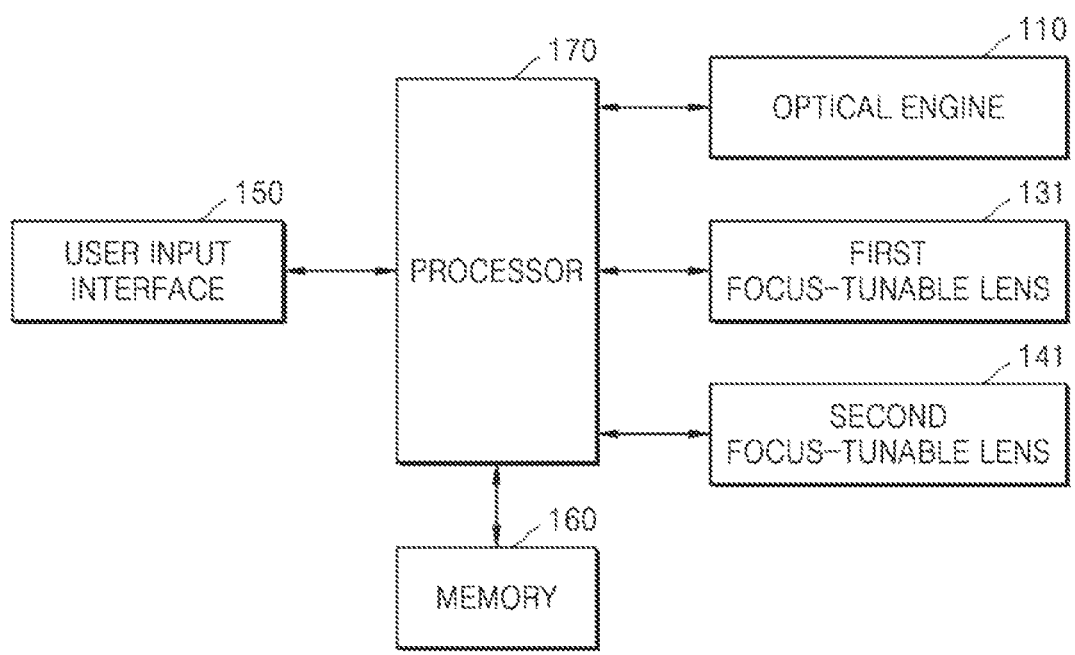
FIG. 4 is a block diagram of the AR device of FIG. 1.

Referring to FIGS. 3 and 4, optical structure and operation of the AR device 100 according to an embodiment will be described in more detail.

FIG. 3 schematically illustrates the AR device 100 according to an embodiment, and FIG. 4 is a block diagram showing components of the AR device 100 according to an embodiment.

Referring to FIG. 3, the AR device 100 according to an embodiment may be an optical system configured to display both a virtual image and a real scene, and may include the optical engine 110, the waveguide 120, the first lens part 130, and the second lens part 140.

The optical engine 110 may be configured to output light $L_V$ of a virtual image.

In an embodiment, the optical engine 110 may include a light source that outputs light, an image panel that forms a two-dimensional (2D) virtual image by using the light output from the light source, and a projecting optical system that projects the light $L_V$ of the virtual image formed on the image panel, and may operate as, for example, a small projector. The light source may be, for example, a light-emitting diode (LED) or a laser diode (LD). The image panel may be, for example, a liquid crystal panel, a liquid crystal on silicon (LCoS) panel, or a digital micromirror device (DMD) panel. The projecting optical system may include at least one sheet of a projection lens.

In another embodiment, the optical engine 110 may include a light source that outputs light and a two-axis scanner that two-dimensionally scans the light output from the light source.

In another embodiment, the optical engine 110 may include a light source that outputs light, a linear image panel that forms a linear image (i.e., a one-dimensional (1D) image) by using the light output from the light source, and a one-axis scanner that scans light of the linear image formed in the linear image panel.

The light $L_V$ of the virtual image may be output from the waveguide 120 and light $L_R$ of the real scene may pass through the waveguide 120. The waveguide 120 may be formed as a single layer or multiple layers of a transparent material in which the light may propagate while being internally reflected. Herein, the transparent material may be a material through which light in a visible light band passes. A transparency of the transparent material may not be 100% and the transparent material may have a certain color. The waveguide 120 may have the shape of a flat plate or a curved plate.

The waveguide 120 may include an input region to which the light $L_V$ of the virtual image projected facing the optical engine 120 is input, a propagation region through which the incident light $L_V$ of the virtual image propagates, and an output region from which the light $L_V$ of the virtual image propagated from the propagation region is output. The input region and the output region are separated from each other. The propagation region may be positioned between the input region and the output region or may be positioned to overlap with at least a part of the input region or the output region.

In the input region, the propagation region, and the output region, an input diffraction grating, a propagation diffraction grating, and an output diffraction grating are provided, respectively. When the waveguide 120 includes a single layer, the input diffraction grating, the propagation diffraction grating, and the output diffraction grating may be formed on a surface of the waveguide 120 facing the optical engine 110 and/or an opposite surface. When the waveguide 120 includes multiple layers, the input diffraction grating, the propagation diffraction grating, and the output diffraction grating may be formed on each layer or some layers of the waveguide 120. The input diffraction grating may be adapted to couple the light $L_V$ output from the optical engine 110 to the waveguide 120. The propagation diffraction grating may be adapted to deliver the light $L_V$ input from the input diffraction grating to the output diffraction grating. For example, the propagation diffraction grating may be an expansion grating that causes the input light $L_V$ to be replicated into multiple ones. The expansion grating may be adapted to split the incident light $L_V$ into a plurality of beamlets for propagation across the entire output region, when the incident light $L_V$ is propagated through total reflection in the waveguide 120. The output diffraction grating may be adapted to output the light $L_V$ propagated in the waveguide 120 to the outside of the waveguide 120 and may also operate as a propagation diffraction grating, for example, an expansion grating. A projection optical system of the optical engine 110 may include a collimating lens and the light $L_V$ emitted by the collimating lens may be parallel light, such that the light $L_V$ finally delivered to the eyes through the waveguide 120 may be substantially regarded as a parallel pencil. For example, the light $L_V$ of the virtual image output through the output diffraction grating may be regarded as light substantially emitted from infinity. Herein, 'substantially' may mean that the virtual image is sufficiently far, substantially close to infinity in terms of visual perspective recognized by a human.

The waveguide 120 may be mounted on a frame such that the output region is positioned in front of the pupils of the user when the user wears the AR device 100. As the waveguide 120 is formed of a transparent material, the user may see the real scene as well as the virtual image through the AR device 100, and thus the AR device 100 may implement AR.

The first lens part 130 may perform focus tuning of the virtual image and vision correction for the user, and thus may be positioned at a side of the waveguide 120 from which the virtual image is output. When the user wears the AR device 100, the first lens part 130 may be positioned between the waveguide 120 and the user's eyes.

The first lens part 130 may include the first focus-tunable lens 131 and a fixed refractive lens 133.

The first focus-tunable lens 131 may be a lens with a first refractive power that varies with a control signal of a processor (170 of FIG. 4). For example, the first focus-tunable lens 131 may be a lens with a focal distance that varies with the control signal of the processor 170.

The first focus-tunable lens 131 according to an embodiment may be a liquid crystal (LC) lens. For example, in the first focus-tunable lens 131, liquid crystal may be positioned between upper and lower transparent substrates, and a common electrode and lens electrodes having a certain pattern are arranged on a side where the upper and lower transparent substrates contact the liquid crystal. The common electrode and the lens electrodes with the certain pattern may be transparent electrodes. In the LC lens, a refractive index distribution of liquid crystal generated upon application of voltage between the common electrode and the lens electrodes may simulate a Fresnel lens.

Figure 5:
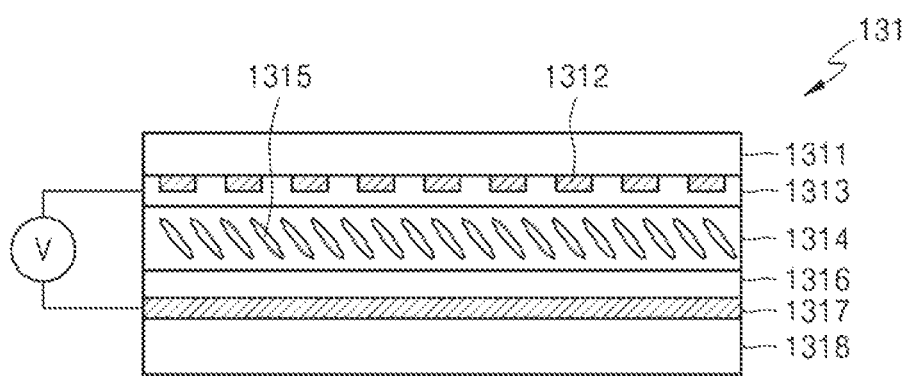
FIG. 5 illustrates a first focus-tunable lens according to an embodiment.

FIG. 5 illustrates the first focus-tunable lens 131 according to an embodiment. Referring to FIG. 5, the first focus-tunable lens 131 has a structure in which an LC layer 1314 is interposed between a first substrate 1311 and a second substrate 1318. A plurality of first electrodes 1312 having a certain pattern may be provided on the first substrate 1311. The first electrodes (lens electrodes) 1312 may be two-dimensionally arranged on the first substrate 1311. In an embodiment, the first electrodes 1312 may be formed of a concentric ring pattern. In another embodiment, the first electrodes 1312 may be formed as a two-dimensional (2D) pixel array pattern. Voltage may be applied to the first electrodes 1312 individually (or independently) or in the unit of a certain group. A common second electrode (common electrode) 1317 may be provided on the second substrate 1318. The second electrode 1317 may be a reference electrode for the first electrodes 1312. Depending on circumstances, the second electrode 1317 may also have the form of an electrode array. The positions of the first electrodes 1312 and the second electrode 1317 may be interchanged with each other. The first focus-tunable lens 131 includes alignment layers 1313 and 1316 that align LC molecules 1315 in the LC layer 1314 in a certain direction. The original alignment of the LC molecules 1315 may be determined by a direction of a force applied to the alignment layers 1313 and 1316, but upon application of proper voltage, the LC molecules 1315 may rotate. Thus, when voltage is applied to the LC layer 1314, the refractive index of the LC layer 1314 may change due to realignment of the LC molecules 1315. As a valid refractive index is locally adjusted by spatially applying a voltage profile to the first electrodes 1312 formed to have the certain pattern, the LC layer 1314 may provide a phase modulation profile having a certain focal distance.

Figure 6:
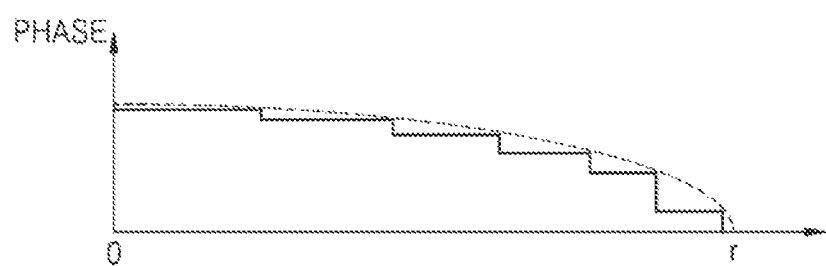
FIG. 6 is a phase profile of a first focus-tunable lens when a control signal has a voltage profile corresponding to a concave lens having a certain refractive power.
Figure 7:
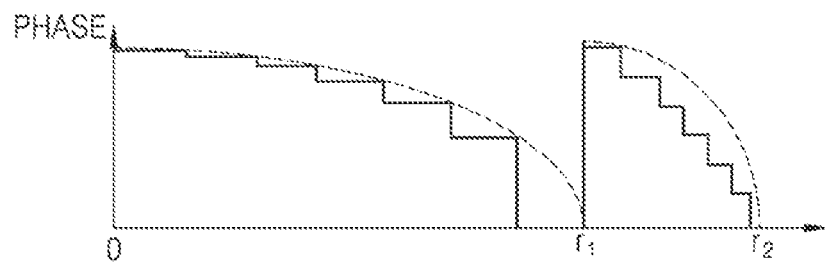
FIG. 7 is a phase profile of a first focus-tunable lens when a control signal has a voltage profile corresponding to a concave lens having a certain refractive power.

FIG. 6 illustrates a phase profile of a first focus-tunable lens 131 when a control signal is a voltage profile corresponding to a concave lens with a certain refractive power, for example, negative two diopter (−2D), and FIG. 7 illustrates a phase profile of the first focus-tunable lens 131 when the control signal is a voltage profile corresponding to a concave lens with a certain refractive power, for example, negative three diopter (−3D).

Referring to FIG. 6, upon application of a voltage profile corresponding to a concave lens with −2D between the first electrodes 1312 and the second electrode 1317, the refractive index distribution of the correspondingly generated LC layer 1314 simulates the Fresnel lens having a refractive power of −2D.

Referring to FIG. 7, upon application of a voltage profile corresponding to a concave lens with −3D between the first electrodes 1312 and the second electrode 1317, the refractive index distribution of the correspondingly generated LC layer 1314 simulates the Fresnel lens having a refractive power of −3D.

In the embodiment, the first focus-tunable lens 131 is an LC lens, for example, but embodiments are not limited thereto. For example, an electrooptic material having a refractive index changing with an applied electric field, such as electroactive polymers, liquid crystalline polymers, or polymer dispersed liquid crystals, may be used in place of LC. In another example, the first focus-tunable lens 131 may be a fluid lens that collects or disperses light by using an interfacial surface between two types of liquid which are not mixed well.

In the LC layer or other focus-tunable lenses, a tunable range or tunable required time of a refractive power, a resolution, etc., may be limited according to a limitation of a manufacturing process, characteristics or driving scheme of an LC material, etc. In addition, the AR device 100 may be limited in terms of a mechanical size or a power in a sense that the AR device 100 is used worn by the user. Thus, as will be described later, there may be a limitation in solving ametropia of the user with the first focus-tunable lens 131.

The fixed refractive lens 133 may be an optical member having a fixed refractive power. In an embodiment, the fixed refractive lens 133 may be a concave lens having a negative (−) refractive power. In the embodiment, the fixed refractive lens 133 is a concave lens, for example, but embodiments are not limited thereto. In another example, the fixed refractive lens 133 may be a Fresnel lens, a graded refractive index (GRIN) lens, a meta lens, etc., with a negative (−) refractive power. In another example, the fixed refractive lens 133 may be a convex lens having a positive (+) refractive power. Refractive power information of the fixed refractive lens 133 may be stored in the memory 160.

The second lens part 140 may compensate for distortion of the real scene caused by the first lens part 130, and may be positioned on a surface opposite to a surface where the first lens part 130 is positioned, with the waveguide 120 between the first lens part 130 and the second lens part 140. That is, when the user wears the AR device 100, the second lens part 140 may be arranged on the outer side of the waveguide 120 (a side in which the real scene is arranged).

The second lens part 140 may include the second focus-tunable lens 141.

The second focus-tunable lens 141 may be a lens with a second refractive power that varies with the control signal of the processor 170. The second focus-tunable lens 141 may have substantially the same structure as the first focus-tunable lens 131. In an embodiment, the second focus-tunable lens 141 may be an LC lens.

The first focus-tunable lens 131 and the second focus-tunable lens 141 may be attached to the waveguide 120 to have a stack structure. In another example, the first focus-tunable lens 131 and the second focus-tunable lens 141 may be spaced by a certain distance from the waveguide 120. The fixed refractive lens 133 may be attached to the first focus-tunable lens 131 or spaced by a certain distance from the first focus-tunable lens 131. In the embodiment, the first focus-tunable lens 131 is arranged between the waveguide 120 and the fixed refractive lens 133, for example, but embodiments are not limited thereto. In another example, the fixed refractive lens 133 may be arranged between the waveguide 120 and the first focus-tunable lens 131.

Referring to FIG. 4, the AR device 100 may include the user input interface 150, the memory 160, and the processor 170, together with an optical system including the first focus-tunable lens 131 and the second focus-tunable lens 141.

Among components shown in FIG. 4, a component having the same reference numeral as that of a component shown in FIG. 3 is the same as the component shown in FIG. 3. Thus, a repeated description will be omitted.

The user input interface 150 may be a means through which the user inputs data for controlling the AR device 100. For example, the user input include 150 may include at least one of a keypad, a dome switch, a touch pad (a capacitive overlay type, a resistive overlay type, an infrared beam type, a surface acoustic wave type, an integral strain gauge type, a piezoelectric effect type, etc.), a jog wheel, a jog switch, etc. The user input interface 150 may receive a user input related to at least any one of the vision information of the user or the focal distance of the virtual image.

The memory 160 may store various data, programs, or applications for driving and controlling the AR device 100 and input/output signals or data of a virtual image, under control of the processor 170. As an example of various data for driving and controlling the AR device 100, user's vision information, refractive power information of a fixed refractive lens, the refractive power tunable range of the first and second focus-tunable lenses 131 and 141, etc., may be stored in advance in the memory 160. A voltage profile for operating the first and second focus-tunable lenses 131 and 141 with corresponding refractive powers may be stored in advance. Data of a virtual image may include attribute distance information of a virtual object in the virtual image.

The memory 160 may include at least one type of hardware devices among, for example, flash memory type, random access memory (RAM), static random access memory (SRAM), read-only memory (ROM), electrically erasable programmable ROM (EEPROM), programmable ROM (PROM), magnetic memory, a magnetic disc, and an optical disc.

The processor 170 may include, for example, at least one hardware among a central processing unit (CPU), a microprocessor, a graphic processing unit (GPU), application specific integrated circuits (ASICs), digital signal processors (DSPs), digital signal processing devices (DSPDs), programmable logic devices (PLDs), or field programmable gate arrays (FPGAs), without being limited thereto.

The processor 170 may drive an operating system or an application program to control the overall operation of the AR device 100 including the optical engine 120 and the first and second focus-tunable lenses 131 and 141, and perform various processing and operations with respect to data including image data. For example, the processor 170 may determine the first refractive power of the first focus-tunable lens 131 based on user's vision information, focal distance of the virtual image, and fixed refractive power information of the fixed refractive lens 133, and control the first focus-tunable lens 131 with a control signal corresponding to the first refractive power. For example, the control signal may be a voltage profile applied to the first focus-tunable lens 131. In another example, the control signal may be a control command signal corresponding to preset voltage profiles. The processor 170 may determine the second refractive power of the second focus-tunable lens 141 based on the focal distance of the virtual image, and control the second focus-tunable lens 141 with a control signal corresponding to the second refractive power.

Figure 8:
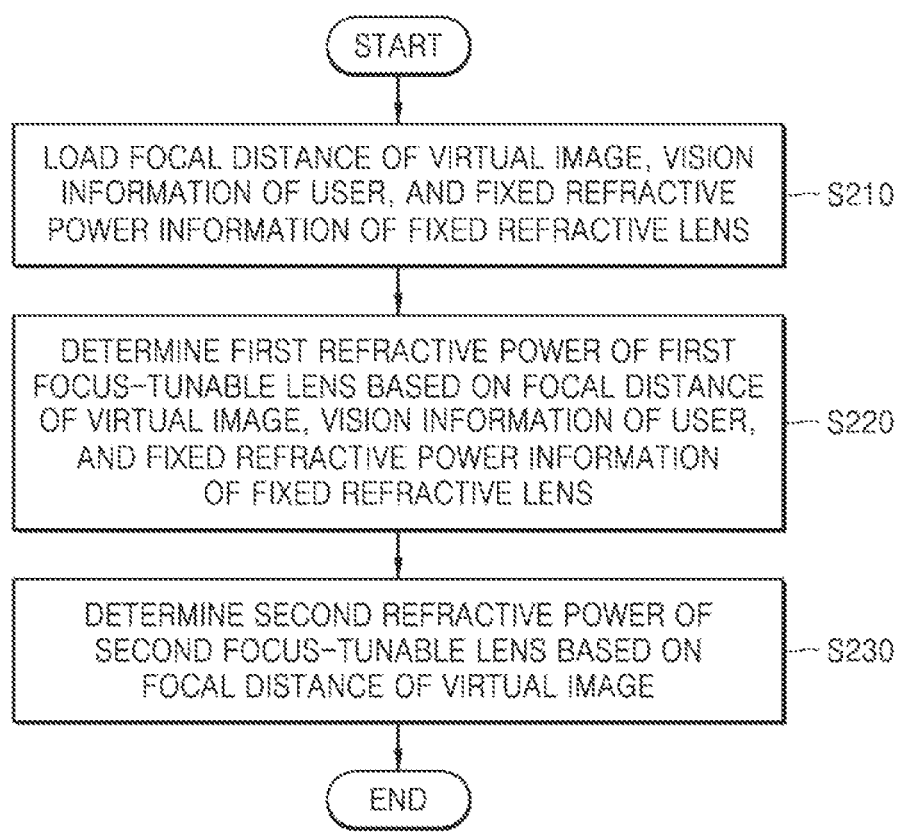
FIG. 8 is a flowchart for describing an operation of an AR device according to an embodiment.

FIG. 8 is a flowchart for describing an operation of the AR device 100 according to an embodiment.

Referring to FIG. 8, to determine the first refractive power of the first focus-tunable lens 131 and the second refractive power of the second focus-tunable lens 141 by reflecting user's vision, the processor 170 may load focal distance of the virtual image, the user's vision information, and the fixed refractive power information from the memory 160, in operation S210.

As described above, the virtual image output from the waveguide 120 may be regarded as being in a substantially infinite position. The user may see the virtual image output from the waveguide 120 through the first lens part 130, such that the focal position of the virtual image may be moved by the first lens part 130.

When the user has ametropia, movement of the focal position of the virtual image may be limited by the ametropia of the user and to correct the ametropia, a correction refractive power is required. For example, when the user has myopia as ametropia, a correction lens for correcting myopia may require a correction-required refractive power of minus diopter (e.g., −3D). According to an embodiment, the user's vision information is a correction-required refractive power, and a correction-required refractive power of the user may be stored in the memory 160. When there are a plurality of users, the user's vision information may include user identification information and the correction-required refractive power of the user. The user's vision information may be previously stored in the memory 160. In an embodiment of the disclosure, the user's vision information may be directly input by the user through the user input interface 150. In an embodiment, the user's vision information may be stored in another electronic device and delivered from the other electronic device in a wired or wireless manner and stored in the memory 160.

The virtual object in the virtual image may include at least one of, for example, a character, a number, a sign, an icon, an image, or animation. The virtual object may be a 3D object as well as a 2D object.

In an embodiment, the virtual object may appear more natural to the user when the virtual object is recognized as being located at a certain distance. For example, when the user sees a desk or a table, sitting on a chair or a sofa, the virtual image (the virtual object) may include an image of a product virtually placed on the desk or the table or information about a product placed on the desk or the table, and an attribute distance of the virtual image (the virtual object) may be about 0.5 meter (m) to about 0.7 meter (m). In another example, when the user does the shopping in a store, the virtual image (the virtual object) may display information about a product at the store, and the attribute distance of the virtual image (the virtual object) may be about 1 m to about 2 m. Thus, representative distance information of the virtual image (the virtual object) or focal distance information appropriate for an attribute of each virtual image (each virtual object) may be stored, together with virtual image data, in the memory 160.

Next, the processor 170 may determine the first refractive power of the first focus-tunable lens 131 based on the focal distance of the virtual image, the vision information of the user, and the fixed refractive power information of the fixed refractive lens 133, in operation S220.

As such, when the user has ametropia, the refractive power of the first focus-tunable lens 131 of the first lens part 130 may be defined as shown below in Equation 1.

$$D_1 = -D_{fixed} + D_{correction} - \frac{1}{f} \quad \text{[Equation 1]}$$

Here, $D_1$ may indicate the first refractive power of the first focus-tunable lens 131, $D_{fixed}$ indicate a fixed refractive power of the fixed refractive lens 133, and $D_{correction}$ may indicate a correction-required refractive power for correcting ametropia of the user. f indicates the focal distance of the virtual image.

The processor 170 may adjust the first refractive power of the first focus-tunable lens 131 such that the focal distance f of the virtual image is the attribute distance of the virtual image, thereby enabling the user to see the virtual image more naturally with the corrected vision.

In the embodiment, a case where there is the attribute distance of the virtual image (the virtual object) is described as an example, but the attribute distance of the virtual image (the virtual object) may not exist. In another embodiment, the focal distance f of the virtual image may be a fixed value irrelevant to the attribute of the virtual image (the virtual object), and thus may be set to about 0.5 m or about 0.7 m based on an aspect in which the AR device 100 is used. In another embodiment, the focal distance f of the virtual image may be a value adjustable by a user's input, regardless of the attribute of the virtual image (the virtual object).

Next, the processor 170 may determine the second refractive power of the second focus-tunable lens 141 based on the focal distance of the virtual image, in operation S230.

The light departing from the real object may enter the pupils of the user through the second lens part 140, the waveguide 120, and the first lens part 130. Due to the first refractive power of the first focus-tunable lens 131 of the first lens part 130 and the fixed refractive power of the first refractive lens 133, the light departing from the real scene may be refracted, causing distortion in the real scene. The second focus-tunable lens 141 of the second lens part 140 may have a certain refractive power to compensate for distortion in the real scene, caused by the first lens part 130. For example, the second refractive power of the second focus-tunable lens 141 may be determined as shown below in Equation 2.

$$D_2 = \frac{1}{f} \quad \text{[Equation 2]}$$

Here, $D_2$ indicates the second refractive power of the second focus-tunable lens 141.

Table 1 shows the first refractive power of the first focus-tunable lens 131, the second refractive power of the second focus-tunable lens 141, and the fixed refractive power of the fixed refractive lens 133 (the concave lens) with respect to user's vision.

TABLE 1

| Classification | User's Vision ($D_{correction}$) | Virtual Focus (f) | Convex Lens ($D_{fixed}$) (−2D) | First Focus-Tunable Lens ($D_1$) (+3D~−3D) | Second Focus-Tunable Lens ($D_2$) (+3D~−3D) |
|---|---|---|---|---|---|
| 1 | 3D Myopia (−3D) | Virtual @ 0.5 m | −2D | −3D | +2D |
| 2 | 2D Myopia (−2D) | | −2D | −2D | +2D |
| 3 | 1.5D Myopia (−1.5D) | | −2D | −1.5D | +2D |
| 4 | 1D Myopia (−1D) | | −2D | −1D | +2D |
| 5 | 3D Myopia (−3D) | Virtual @ 0.7 m | −2D | −2.5D | +1.5D |
| 6 | 2D Myopia (−2D) | | −2D | −1.5D | +1.5D |

TABLE 1-continued

| Classification | User's Vision ($D_{correction}$) | Virtual Focus (f) | Convex Lens ($D_{fixed}$) (-2D) | First Focus-Tunable Lens ($D_1$) (+3D~-3D) | Second Focus-Tunable Lens ($D_2$) (+3D~-3D) |
|---|---|---|---|---|---|
| 7 | 1.5D Myopia (-1.5D) | | -2D | -1D | +1.5D |
| 8 | 1D Myopia (-1D) | | -2D | -0.5D | +1.5D |

In Classification 1 of Table 1, when the correction-required refractive power of the user is -3D, the focal distance (the virtual focus) of the virtual image is 0.5 m, and the fixed refractive power of the concave lens is -2D, the first refractive power of the first focus-tunable lens 131 may be -3D and the second refractive power of the second focus-tunable lens 141 may be +2D.

As another example, in Classification 5, when the correction-required refractive power of the user is -3D, the focal distance (the virtual focus) of the virtual image is 0.7 m, and the fixed refractive power of the concave lens is -2D, the first refractive power of the first focus-tunable lens 131 may be -2.5D and the second refractive power of the second focus-tunable lens 141 may be +1.5D. When the focal distance of the virtual image is about 0.7 m, $$\frac{1}{f}$$

may be generally regarded as 1.5D for calculation.

In general, a sum of the first refractive power of the first focus-tunable lens 131 of the first lens part 130 and the fixed refractive power of the fixed refractive lens 133 may be asymmetric to the second refractive power of the second focus-tunable lens 141. That is, an absolute value of a sum of refractive powers of the first lens part 130 is not equal to an absolute value of the refractive power of the second lens part 140.

As described above, in the first and second focus-tunable lenses 131 and 141, a tunable range or tunable required time of a refractive power, a resolution, etc., may be limited according to a limitation of a manufacturing process, characteristics or driving scheme of a material, etc. For example, the valid refractive power tunable range of the first and second focus-tunable lenses 131 and 141 may be from about +3D to about -3D. As shown in Table 1, the AR device 100 according to the embodiment may determine the first refractive power and the second refractive power of the first focus-tunable lens 131 and the second focus-tunable lens 141 within a valid refractive power tunable range.

The first focus-tunable lens 131 and the second focus-tunable lens 141 may have a limitation in having high refractive power due to a limitation in pattern refinement of the lens electrode, for example, the first electrodes 1312 in FIG. 5 or instability of LC alignment at a point requiring a rapid change in the phase of light. For example, when the user has ametropia, a required refractive power may be difficult to manage merely with the first focus-tunable lens 131. In the embodiment, by arranging the fixed refractive lens (the concave lens) 133 in the first lens part 130, a refractive power load on the first focus-tunable lens 131 may be reduced, thereby achieving a high resolution of the virtual image.

In the foregoing embodiment, a description is made of a case where the processor 170 loads the focal distance of the virtual image, the user's vision information, and the fixed refractive power information from the memory 160 and determine the first refractive power of the first focus-tunable lens 131, but embodiments are not limited thereto. For a particular user, user's vision information and fixed refractive power information are already fixed values, such that the user's vision information and the fixed refractive power information may be previously calculated as shown in Equation 3 provided below and previously stored in the memory 160.

$$D_{modified} = -D_{fixed} + D_{correction} \qquad [\text{Equation 3}]$$

$D_{modified}$ indicates a modified correction-required refractive power, and may be understood as a correction-required refractive power into which the refractive power of the fixed refractive lens is reflected.

Figure 9:
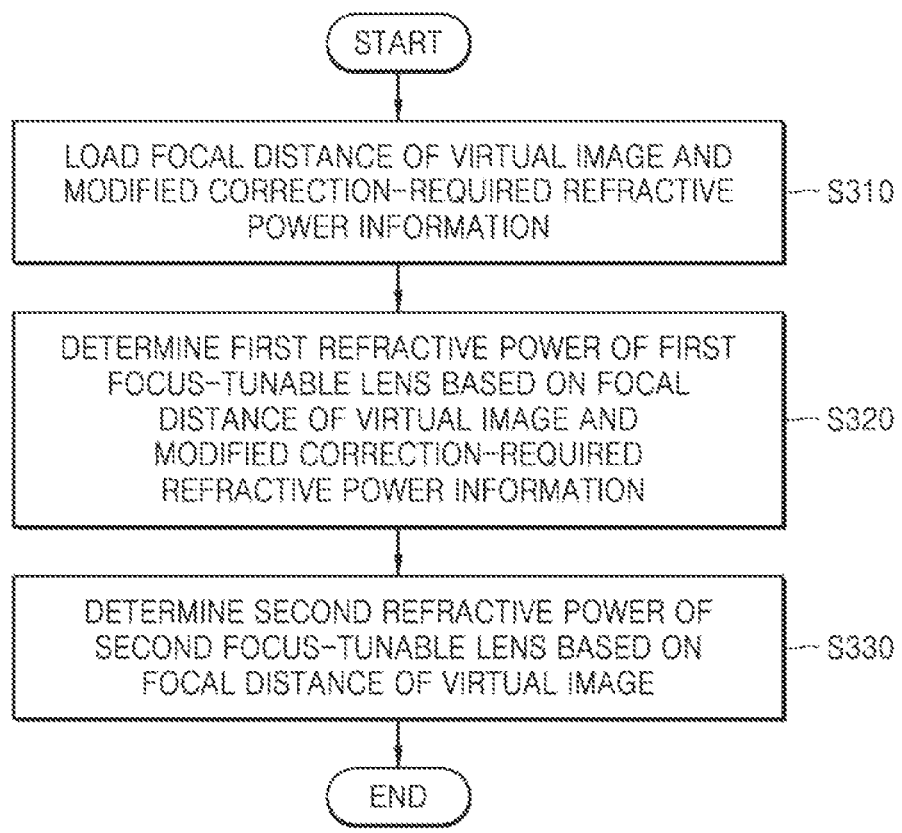
FIG. 9 is a flowchart for describing an operation of an AR device according to an embodiment.

FIG. 9 is a flowchart for describing an operation of an AR device according to an embodiment. The embodiment may correspond to a case where the modified correction-required refractive power $D_{modified}$ is previously stored in the memory 160. Referring to FIG. 9, to determine the first refractive power of the first focus-tunable lens 131 and the second refractive power of the second focus-tunable lens 141 by reflecting user's vision, the processor 170 may load the modified correction-required refractive power $D_{modified}$ and the focal distance f of the virtual image from the memory 160, in operation S310.

Next, after the modified correction-required refractive power $D_{modified}$ and the focal distance f of the virtual image are read from the memory 160, the first refractive power of the first focus-tunable lens 131 of the first lens part 130 may be determined using Equation 4 provided below in operation S320.

$$D_1 = D_{modified} - \frac{1}{f} \qquad [\text{Equation 4}]$$

As such, by using the modified correction-required refractive power in which the user's vision information and the fixed refractive power information are previously calculated, the number of pieces of information loaded from the memory 160 may be reduced and an operation for determining the first refractive power may be further simplified.

Next, the processor 170 may determine the second refractive power of the second focus-tunable lens 141 based on the focal distance of the virtual image as in Equation 2, in operation S330.

Figure 10:
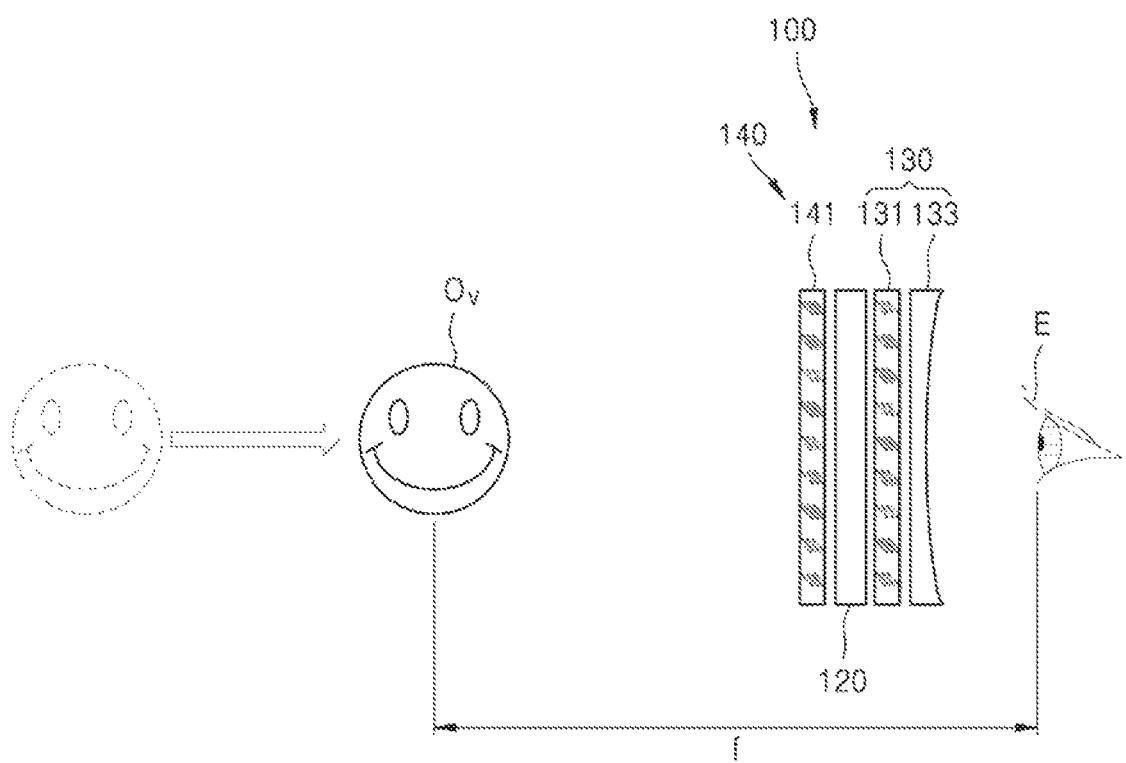
FIG. 10 is a view for describing an operation of an AR device according to an embodiment.

FIG. 10 is a flowchart for describing an operation of the AR device 100, according to an embodiment.

The user having ametropia may need a correction-required refractive power due to the ametropia. A virtual image (a virtual object) $O_V$ displayed on the AR device 100 may have a focal distance appropriate for attributes thereof. Alternatively, the virtual image (the virtual object) $O_V$ may use a representative distance previously input to the AR device 100 as a focal distance. When the user desires to see the virtual image (the virtual object) $O_V$, wearing the AR device 100, the processor 170 may determine the first refractive power of the first focus-tunable lens 131 and the second refractive power of the second focus-tunable lens 141 and control the first focus-tunable lens 131 and the second focus-tunable lens 141 corresponding to the determined first refractive power and second refractive power, as described with reference to FIGS. 8 and 9. As a result, the user may correct vision using the first lens part 130 in spite of having ametropia, and may be able to see the virtual image (the virtual object) O$_V$ at the focal distance f that is an infinite distance by using the first lens part 130, such that the user may clearly and naturally see the virtual image (the virtual object) O$_V$. In addition, the user may see the real scene without distortion caused by the first lens part 130, by using the second refractive power of the second lens part 140.

Figure 11:
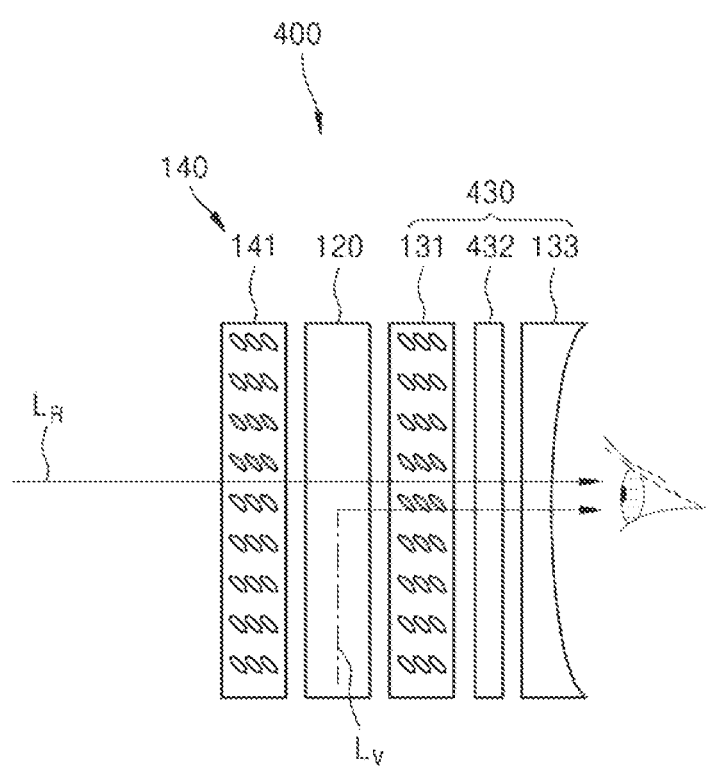
FIG. 11 illustrates arrangement of optical parts of an AR device according to an embodiment.

FIG. 11 illustrates arrangement of optical parts of an AR device 400 according to an embodiment.

Referring to FIG. 11, the AR device 400 according to the embodiment may include the optical engine 110, the waveguide 120, a first lens part 430, and the second lens part 140. The AR device 400 according to the embodiment is the same as the above-described embodiments except that the first lens part 430 further includes a polarization plate 432, such that a description will be made based on a difference.

The first lens part 430 may include the first focus-tunable lens 131, the polarization plate 432, and the fixed refractive lens 133. In an embodiment, the polarization plate 432 may be arranged between the first focus-tunable lens 131 and the fixed refractive lens 133. The polarization plate 432 may pass first polarized light therethrough and block second polarized light. The first polarized light may be linear polarized light (e.g., p polarized light). The first focus-tunable lens 131 may be an LC lens. A refractive index of the LC lens may vary with the first polarized light (e.g., the p polarized light) and the second polarized light (e.g., s polarized light) that is orthogonal to the first polarized light due to the nature of double refraction. Thus, by arranging the polarization plate 432 between the first focus-tunable lens 131 and the fixed refractive lens 133, light (i.e., noise) having a different refraction magnitude among light passing through the first focus-tunable lens 131 may be canceled.

FIG. 11 shows that the polarization plate 432 is arranged between the first focus-tunable lens 131 and the fixed refractive lens 133, for example, but embodiments are not limited thereto. In an embodiment, the polarization plate 432 may be arranged between the waveguide 120 and the first focus-tunable lens 131. That is, the waveguide 120, the polarization plate 432, the first focus-tunable lens 131, and the fixed refractive lens 133 may be arranged in that order. In another example, the waveguide 120, the fixed refractive lens 133, the polarization plate 432, and the first focus-tunable lens 131 may be arranged in that order, or the waveguide 120, the polarization plate 432, the fixed refractive lens 133, and the first focus-tunable lens 131 may be arranged in that order.

Figure 12:
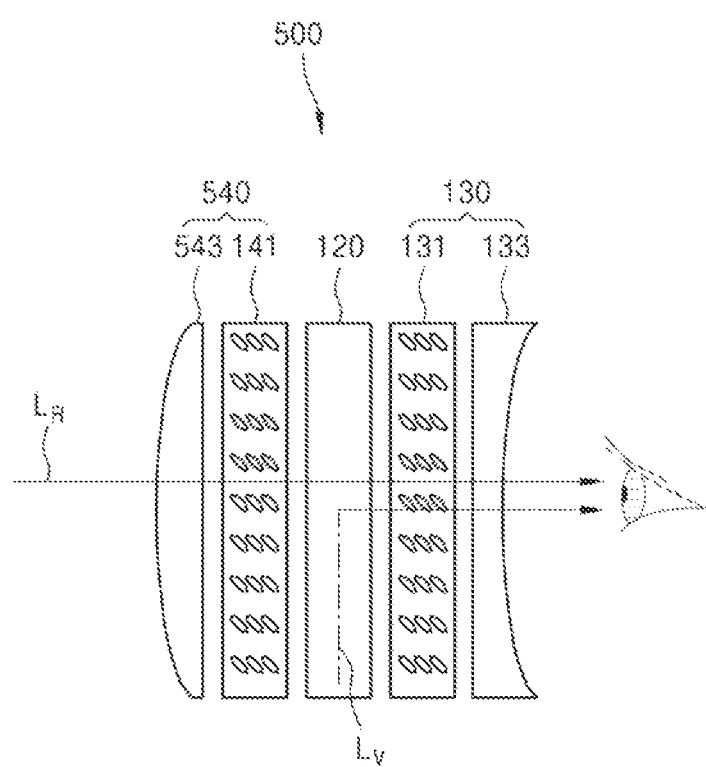
FIG. 12 illustrates arrangement of optical parts of an AR device according to an embodiment.

FIG. 12 illustrates arrangement of optical parts of an AR device according to an embodiment.

Referring to FIG. 12, an AR device 500 according to the embodiment may include the optical engine 110, the waveguide 120, the first lens part 130, and a second lens part 540. The first lens part 130 may include the first focus-tunable lens 131 and the first fixed refractive lens 133, and the second lens part 540 may include the second focus-tunable lens 141 and a second fixed refractive lens 543. In an embodiment of the disclosure, the second fixed refractive lens 543 may be a convex lens having a positive (+) refractive power. In the embodiment, the second fixed refractive lens 543 is a convex lens, for example, but embodiments are not limited thereto. In another example, the second fixed refractive lens 543 may be a Fresnel lens, a GRIN lens, a meta lens, etc., with a positive (+) refractive power. The AR device 500 according to the embodiment is the same as the above-described embodiments except that the second lens part 540 further includes the second fixed refractive lens 543.

A refractive power D'$_2$ the second lens part 540 has to have to compensate for distortion of the real scene, caused by the first lens part 130, may be determined by Equation 5 shown below.

$$D'_2 = \frac{1}{f} \qquad \text{[Equation 5]}$$

The refractive power D'$_2$ of the second lens part 540 is given as a sum of the second refractive power D$_2$ of the second focus-tunable lens 141 and a fixed refractive power D$_{fixed2}$ of the second fixed refractive lens 543, such that the refractive power D$_2$ of the second focus-tunable lens 141 is determined by Equation 6 shown below.

$$D_2 = \frac{1}{f} - D_{fixed2} \qquad \text{[Equation 6]}$$

As described above, the second lens part 540 compensates for distortion of the real scene caused by the first lens part 130, and the second refractive power to be managed by the second focus-tunable lens 131 of the second lens part 540 may be excessively high according to the user's vision, etc. In the embodiment, by distributing the second refractive power required for the second focus-tunable lens 141 with the second fixed refractive lens 543, a load on the second focus-tunable lens 141 may be reduced, thereby achieving a high resolution of the virtual image.

Table 2 shows the first refractive power D$_1$ of the first focus-tunable lens 131, the second refractive power D$_2$ of the second focus-tunable lens 141, the fixed refractive power D$_{fixed1}$ of the first fixed refractive lens 133 (the concave lens), and the fixed refractive power D$_{fixed2}$ of the second fixed refractive lens 543 (the convex lens) with respect to user's vision.

TABLE 2

| Classification | User's Vision (D$_{correction}$) | Virtual Focus (f) | First Fixed Refractive Lens (D$_{fixed1}$) (−2D) | First Focus-Tunable Lens (D$_1$) (+3D~−3D) | Second Fixed Refractive Lens (D$_{fixed2}$) (+1D) | Second Focus-Tunable Lens (D$_2$) (+3D~−3D) |
|---|---|---|---|---|---|---|
| 1 | 3D Myopia (−3D) | Virtual @ | −2D | −3D | +1D | +1D |
| 2 | 2D Myopia (−2D) | 0.5 m | −2D | −2D | +1D | +1D |

TABLE 2-continued

| Classification | User's Vision ($D_{correction}$) | Virtual Focus (f) | First Fixed Refractive Lens ($D_{fixed1}$) (−2D) | First Focus-Tunable Lens ($D_1$) (+3D~−3D) | Second Fixed Refractive Lens ($D_{fixed2}$) (+1D) | Second Focus-Tunable Lens ($D_2$) (+3D~−3D) |
|---|---|---|---|---|---|---|
| 3 | 1.5D Myopia (−1.5D) | | −2D | −1.5D | +1D | +1D |
| 4 | 1D Myopia (−1D) | | −2D | −1D | +1D | +1D |
| 5 | 3D Myopia (−3D) | Virtual @ 0.7 m | −2D | −2.5D | +1D | +0.5D |
| 6 | 2D Myopia (−2D) | | −2D | −1.5D | +1D | +0.5D |
| 7 | 1.5D Myopia (−1.5D) | | −2D | −1D | +1D | +0.5D |
| 8 | 1D Myopia (−1D) | | −2D | −0.5D | +1D | +0.5D |

In Classification 1 of Table 2, when the user's correction-required refractive power $D_{correction}$ is −3D, the focal distance (a virtual focus) f of the virtual image is 0.5 m, the fixed refractive power $D_{fixed1}$ of the first fixed refractive lens 133 (the concave lens) is −2D, and the fixed refractive power $D_{fixed2}$ of the second fixed refractive lens 543 (the convex lens) is +1D, the first refractive power $D_1$ of the first focus-tunable lens 131 may be −3D and the second refractive power $D_2$ of the second focus-tunable lens 141 may be +1D.

In another example, in Classification 5, when the user's correction-required refractive power $D_{correction}$ is −3D, the focal distance (the virtual focus) f of the virtual image is 0.7 m, the fixed refractive power $D_{fixed1}$ of the first fixed refractive lens 133 (the concave lens) is −2D, and the fixed refractive power $D_{fixed2}$ of the second fixed refractive lens 543 (the convex lens) is +1D, the first refractive power $D_1$ of the first focus-tunable lens 131 may be −2.5D and the second refractive power $D_2$ of the second focus-tunable lens 141 may be +0.5D. When the focal distance of the virtual image is about 0.7 m, 1/f may be generally regarded as 1.5D for calculation.

In general, a sum of the first refractive power of the first focus-tunable lens 131 of the first lens part 130 and the fixed refractive power of the first fixed refractive lens 133 may be asymmetric to a sum of the second refractive power of the second focus-tunable lens 141 of the second lens part 540 and the fixed refractive power of the second fixed refractive lens 543. That is, an absolute value of a sum of refractive powers of the first lens part 130 is not equal to an absolute value of a sum of refractive powers of the second lens part 540.

Figure 13:
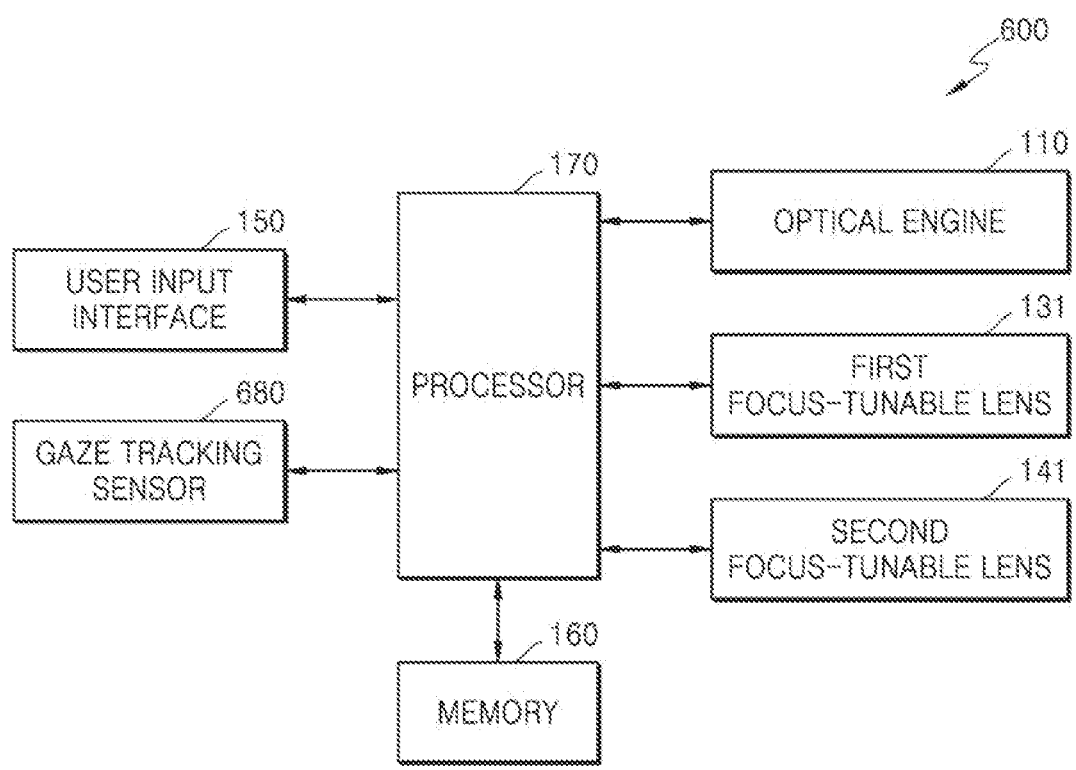
FIG. 13 is a block diagram of an AR device according to an embodiment.

FIG. 13 is a block diagram of an AR device 600 according to an embodiment.

Referring to FIG. 13, the AR device 600 according to the embodiment may include the user input interface 150, the memory 160, the processor 170, and a gaze tracking sensor 680, together with an optical system including the optical engine 110, the first focus-tunable lens 131, and the second focus-tunable lens 141. The AR device 600 according to the embodiment is substantially the same as the AR device 100 according to the embodiment described with reference to FIG. 4 except that the AR device 600 further includes the gaze tracking sensor 680, such that a description will be made of a difference occurring due to additional inclusion of the gaze tracking sensor 680.

The gaze tracking sensor 680, which is a device for tracking a gaze direction of the eyes of the user, may detect an image of pupils of the human or detect a direction or a quantity in which illumination light such as near-infrared light is reflected from the cornea, thereby detecting the gaze direction of the user. The gaze tracking sensor 680 may include a left-eye gaze tracking sensor and a right-eye gaze tracking sensor which detect the gaze direction of the left eye of the user and the gaze direction of the right eye of the user, respectively. Detection of the gaze direction of the user may include obtaining gaze information related to the gaze of the user.

Figure 14:
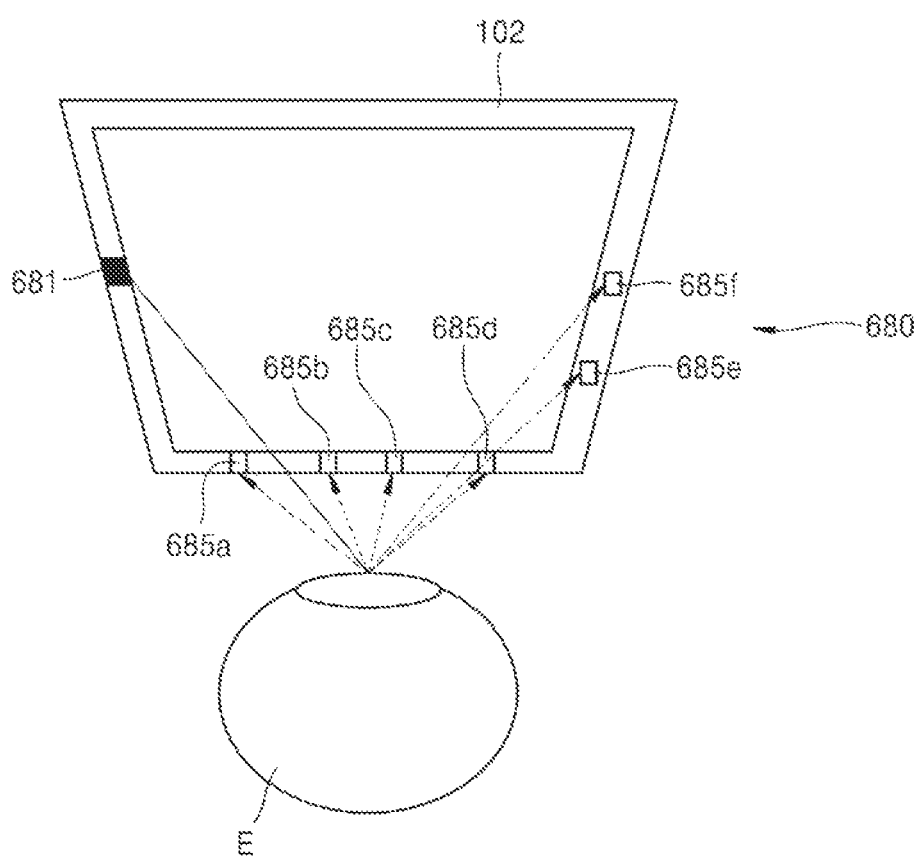
FIG. 14 illustrates a gaze tracking sensor according to an embodiment.

FIG. 14 illustrates the gaze tracking sensor 680 according to an embodiment. Referring to FIG. 14, the gaze tracking sensor 680 may include an infrared radiator 681 and a plurality of infrared detectors 685a through 685f. While six infrared detectors 685a through 685f are illustrated in FIG. 14, this is merely for convenience of a description, and the number of plural infrared detectors 685a through 685f is not limited to the illustration.

The infrared radiator 681 may radiate infrared light to a cornea part in which a crystalline lens of an eye E is located, and the plurality of infrared detectors 685a through 685f may detect the infrared light reflected from the cornea. In an embodiment, the gaze tracking sensor 680 may obtain information about the quantity of infrared light detected by each of the plurality of infrared detectors 685a through 685f and obtain information about a gaze direction in which the eye E of the user gazes based on the obtained information about the quantity of the infrared light. The gaze tracking sensor 680 may provide the obtained information about the gaze direction to the processor 170. For example, the information about the gaze direction obtained by the gaze tracking sensor 680 may include gaze angle information in horizontal and vertical directions of the left eye and gaze angle information in the horizontal and vertical directions of the right eye.

As the gaze tracking sensor 680 according to the embodiment, an IR scanner scheme using infrared illumination light is described for example, but embodiments are not limited thereto. In another example, the gaze tracking sensor 680 may include an image sensor that captures an image of the pupil of the human. Based on the captured image of the eye of the user, gaze angle information in the horizontal and vertical directions of the left eye and gaze angle information in the horizontal and vertical directions of the right eye may be detected.

Referring back to FIG. 13, according to an embodiment, the gaze tracking sensor 680 may sense the eye of the user wearing the AR device 600 at certain time intervals. The processor 170 may calculate the gaze point of the user based on the information about the gaze directions of the left eye and the right eye, detected by the gaze tracking sensor 680. For example, when the user sees an object of the real scene together with a virtual image displayed by the AR device 100, the processor 170 may determine a depth (i.e., a focal distance) of the virtual image based on the calculated gaze point.

Next, a method of calculating a gaze point from information about a gaze direction, measured by the gaze tracking sensor 680, will be described with reference to FIGS. 15 through 17.

Figure 15:
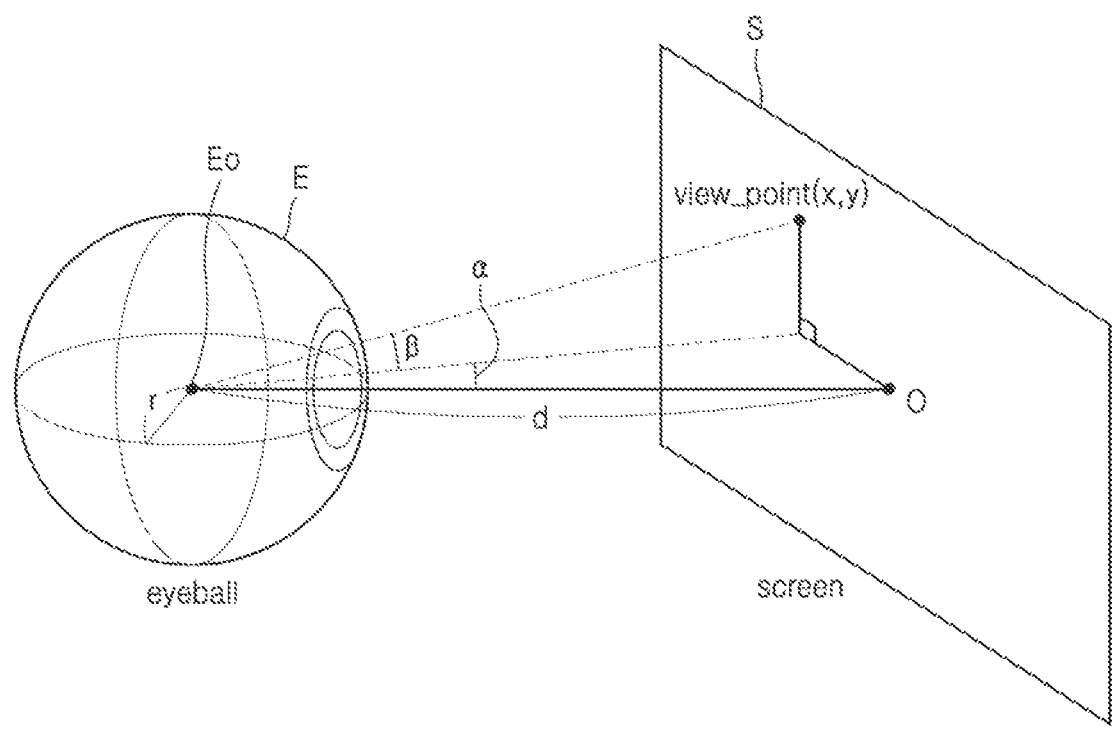
FIG. 15 illustrates a three-dimensional (3D) eyeball model with respect to a gaze direction of a user.

FIG. 15 illustrates a three-dimensional (3D) eyeball model with respect to a gaze direction of a user.

Referring to FIG. 15, tracking of a gaze direction according to an embodiment may be performed based on a 3D eyeball model with respect to a gaze. Assuming that the 3D eyeball model with respect to the gaze is a complete sphere and the eyeball ideally spatially rotates along the gaze, the gaze may be mathematically modeled as shown in Equation 7 provided below:

$$x = d \cdot \tan\alpha \quad \text{[Equation 7]}$$
$$y = d \cdot \sec\alpha \cdot \tan\beta$$

$$\beta = \sin^{-1}\frac{\Delta y}{r} \quad \text{[Equation 8]}$$
$$\alpha = \sin^{-1}\frac{\Delta x}{r\cos\beta}$$

In Equation 7, d indicates a distance between a center Eo of the eye (eyeball) E of the user and a virtual screen S, α indicates an angle by which the eye of the user rotates in an x-axis (horizontal-axis) direction with respect to a case where the user's eye frontally gazes at the virtual screen S, and β indicates an angle by which the eye of the user rotates in a y-axis (vertical-axis) direction with respect to the case where the user's eye frontally gazes at the virtual screen S. In addition, in Equation 8, r indicates a radius of a sphere assuming that the eye of the user is the sphere.

The eye tracking sensor 680 according to an embodiment of the disclosure may measure a degree of rotation (e.g., α and β) of the eye (eyeball) E of the user, and the AR device 500 may calculate two-dimensional (2D) position coordinates (x, y) of the gaze direction of the eye (eyeball) E of the user on the virtual screen S by using the degree of rotation (α and β) of the eye (eyeball) E of the user. The degree of rotation (α and β) of the eye (eyeball) E may be understood as gaze angle information in the horizontal and vertical directions.

Actual movement of the eye may not include ideal 3D rotation, and in particular, relaxation/contraction of eye muscles act greatly in terms of left/right gazes, such that an error may occur in estimation of top/bottom gazes with respect to the left/right gazes based on an ideal 3D rotation eyeball model. The AR device 600 may solve the error by causing the user to see a random point and comparing a gaze direction estimated by the gaze tracking sensor 680 with an actual gaze direction with respect to the point to statistically process them, thereby improving accuracy.

Figure 16:
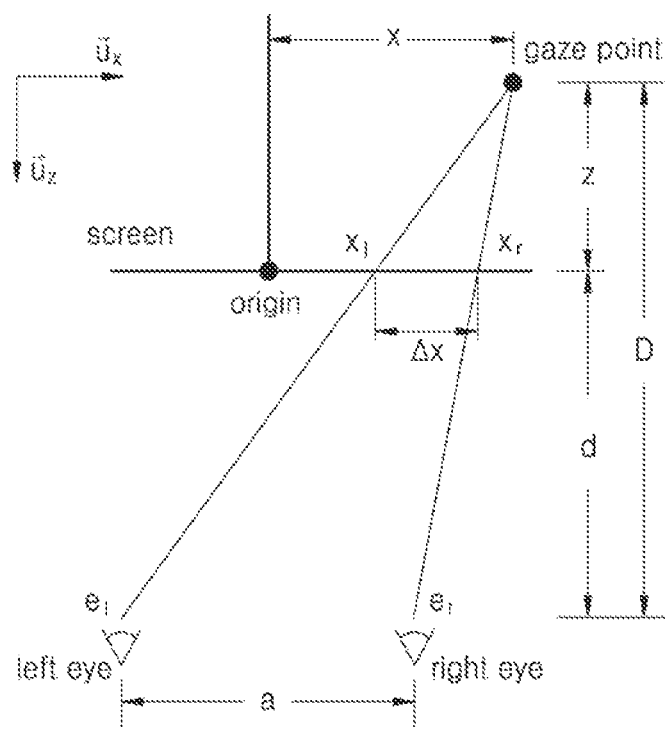
FIG. 16 is a view for describing a relationship between a gaze angle and a gaze point in a left eye and a right eye.
Figure 17:
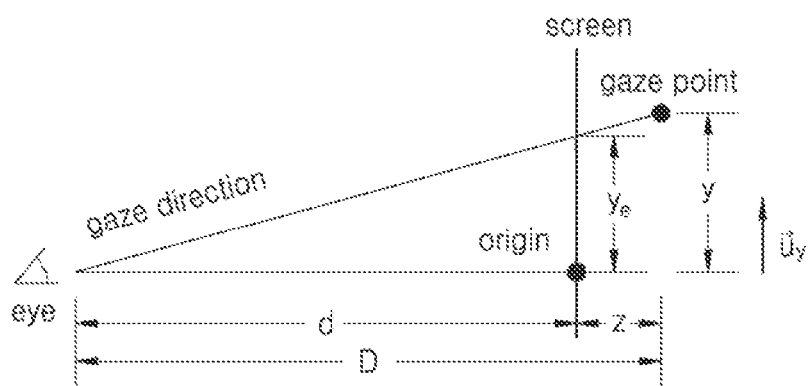
FIG. 17 is a view for describing a relationship between a gaze angle and a gaze point in an upward gaze direction.

FIG. 16 is a view for describing a relationship between a gaze angle and a gaze point in a left eye and a right eye, and FIG. 17 is a view for describing a relationship between a gaze angle and a gaze point in an upward gaze direction.

Referring to FIGS. 16 and 17, a focal distance may be estimated based on a difference between gaze directions (or gaze coordinates) of both eyes obtained through the gaze tracking sensor 680. When the focal distance to the gaze point is obtained, gaze axes of the both eyes may not meet each other, and in this case, a vertical-axis (y-axis) coordinate may be calculated as an average of vertical-axis (y-axis) coordinates of the two eyes assuming that the two eyes are in the same height. A distance a between the both eyes may be assumed to be, for example, about 7 cm. By using a proportional expression based on a geometric(al) assumption, the following Equation 9 may be obtained.

$$\frac{-z}{\Delta x} = \frac{d-z}{a} \quad \text{[Equation 9]}$$

In Equation 9, a distance d to a virtual screen and the distance a between the eyes are required, and the distance d may be obtained by measuring a rotation angle of the eyeball using a gaze image in which the user gazes at the front. As a result, a distance D to the gaze point may be given by Equation 10 below.

$$D = d + z = d + \frac{\Delta x d}{\Delta x - a} = \left(1 + \frac{\Delta x}{\Delta x - a}\right) \cdot d \quad \text{[Equation 10]}$$

Δx indicates a horizontal interval between gaze coordinates of the both eyes on the virtual screen S, and may be obtained from gaze angles of the left eye and the right eye of the user as can be seen from Equations 7 and 8.

Figure 18:
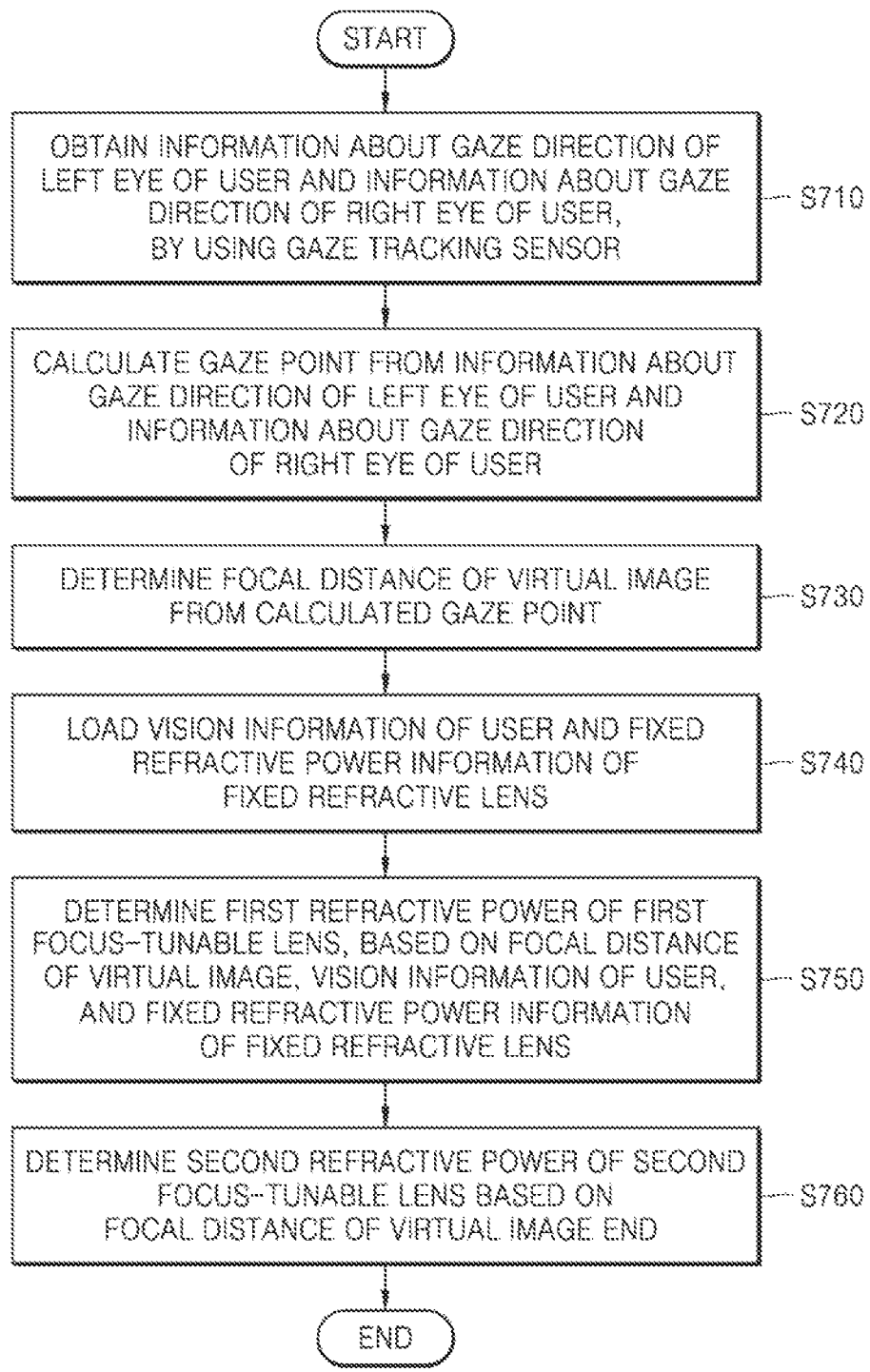
FIG. 18 is a flowchart for describing an operation of an AR device according to an embodiment.

FIG. 18 is a flowchart for describing an operation of the AR device 600 according to an embodiment.

Referring to FIG. 18, to determine the first refractive power of the first focus-tunable lens 131 and the second refractive power of the second focus-tunable lens 141 by reflecting user's vision, the AR device 600 may obtain the focal distance of the virtual image.

First, the gaze tracking sensor 680 of the AR device 600 may obtain information about the gaze direction of the left eye of the user and information about the gaze direction of the right eye of the user, in operation S710.

Next, as the example described with reference to FIGS. 15 through 17, the processor 170 of the AR device 600 may obtain calculate a gaze point from the information about the gaze direction of the left eye of the user and the information about the gaze direction of the right eye of the user, in operation S720.

Next, the processor 170 may determine the focal distance of the virtual image based on the obtained gaze point, in operation S730.

In an embodiment, when the user sees the real scene together with the virtual image displayed by the AR device 100, the user may gaze at the real object, which is a subject of interest of the user, in the real scene, and it may be natural that the virtual image (the virtual object) is placed in the same depth as the real object. Thus, a depth that is similar to a depth to the gaze point of the user (i.e., a distance between the eye of the user and the gaze point) may be set to the focal distance of the virtual image. Herein, the similar depth may include not only a case where the focal distance of the virtual image is equal to the depth to the gaze point of the user, but also a depth in a range naturally recognized by the user. For example, the focal distance of the virtual image may be changed in an approximate size range of the real object.

As described below, by setting the focal distance of the virtual image to a depth corresponding to the gaze point of the user detected by the gaze tracking sensor 680, the user may naturally see the real scene together with the virtual image displayed by the AR device 100.

While operations S720 and S730 are described separately in the embodiment, operation S730 may be substantially omitted by regarding the calculated distance to the gaze point as the focal distance.

The processor 170 may load the user's gaze information and the fixed refractive power information from the memory 160, in operation S740. Operation S740 may be performed reversely to or simultaneously with operations S710 through S730.

Next, the processor 170 may determine the first refractive power of the first focus-tunable lens 131 based on the focal distance of the virtual image, the vision information of the user, and the fixed refractive power information of the fixed refractive lens 133, in operation S720. For example, the first refractive power of the first focus-tunable lens 131 of the first lens part 130 may be determined using Equation 1 described above, and enables the user to naturally see the virtual image with corrected vision.

In the embodiment, a description is made of a case where the user's vision information and the fixed refractive power information are previously stored, as an example, but embodiments are not limited thereto. As in the example described with reference to FIG. 9, the user's vision information and the fixed refractive power information may be previously calculated and stored as the modified correction-required refractive power in the memory 160, and the processor 170 may determine the first refractive power of the first focus-tunable lens 131 based on the focal distance of the virtual image and the modified correction-required refractive power information.

Next, the processor 170 may determine the second refractive power of the second focus-tunable lens 141 of the second lens part 140, based on the focal distance of the virtual image, in operation S760. The second refractive power of the second focus-tunable lens 141 may be determined using Equation 2 described above, and distortion of the real scene, caused by the first lens part 130, may be compensated.

In the embodiment, the virtual image (the virtual object) may be 3D as well as 2D. For example, the virtual image may provide a cubic effect based on binocular disparity. The virtual image using binocular disparity may generate a left-eye virtual image and a right-eye virtual image in different viewpoints, and in this case, the different viewpoints may include a view point with the left eye of the user and a view point from with right eye of the user. Thus, by causing the virtual image to have binocular disparity corresponding to the focal distance determined in operation S730, the user may see the virtual image naturally.

Figure 19:
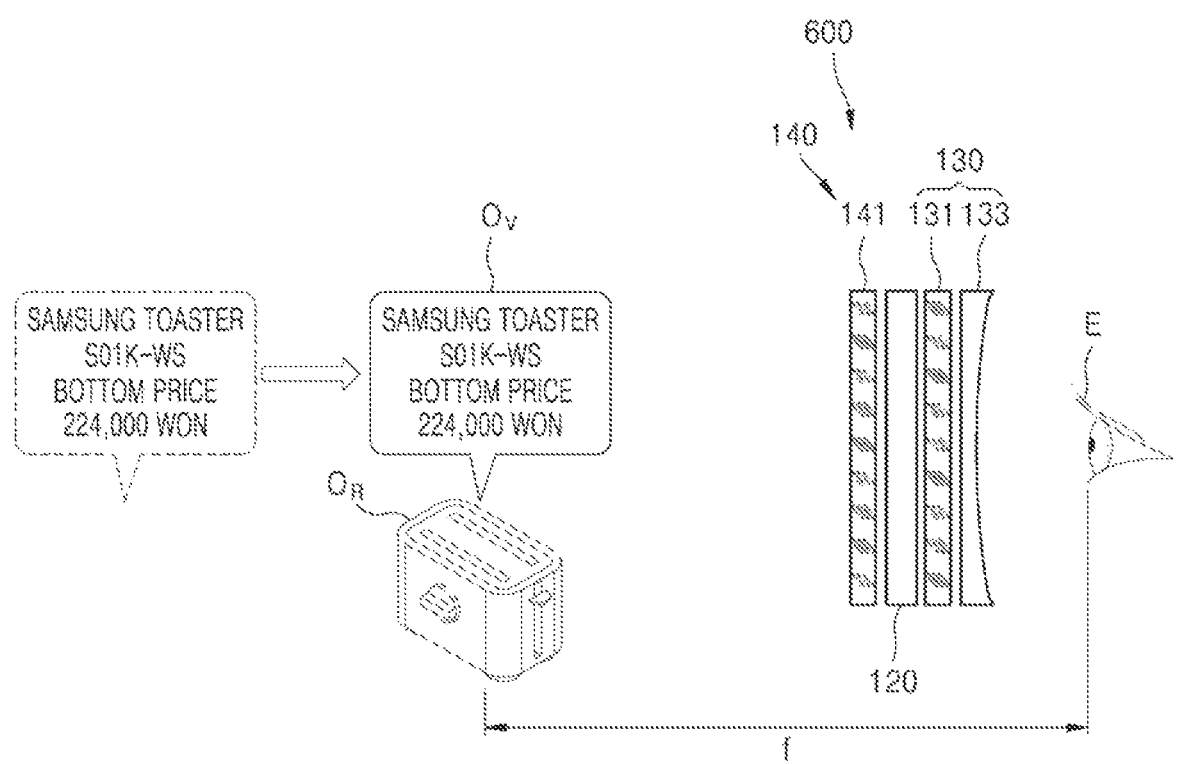
FIG. 19 is a view for describing an operation of an AR device according to an embodiment.

FIG. 19 is a view for describing an operation of an AR device according to an embodiment.

When the user wearing the AR device 100 sees a product (a real object) $O_R$ in a store, the AR device 100 may display information about the product through a virtual image (a virtual object) $O_V$. For example, when the user gazes at the product (the real object) $O_R$, the gaze tracking sensor 680 of the AR device 100 may track the gaze of the user and the processor 170 may calculate a gaze point from information about a tracked gaze direction of the user and determine a distance to the product (the real object) $O_R$ from the gaze point as the focal distance f of the virtual image (the virtual object) $O_V$. The processor 170 may determine the first refractive power of the first focus-tunable lens 131 based on the focal distance f of the virtual image (the virtual object) $O_V$, the user's vision information, and the fixed refractive power information of the fixed refractive lens 133, determine the second refractive power of the second focus-tunable lens 141 of the second lens part 140 based on the focal distance f of the virtual image (the virtual object) $O_V$, and control the first and second focus-tunable lenses 131 and 141 corresponding to the determined first and second refractive powers. As a result, the user may correct vision using the first lens part 130 in spite of having ametropia, and may draw the focal distance f from the infinite distance closely to the position where the product (the real object) $O_R$ is located, such that the user may more clearly and naturally see the virtual image (the virtual object) $O_V$. In addition, the user may see the product (the real object) $O_R$ without distortion caused by the first lens part 130, by using the second refractive power of the second lens part 140.

Figure 20:
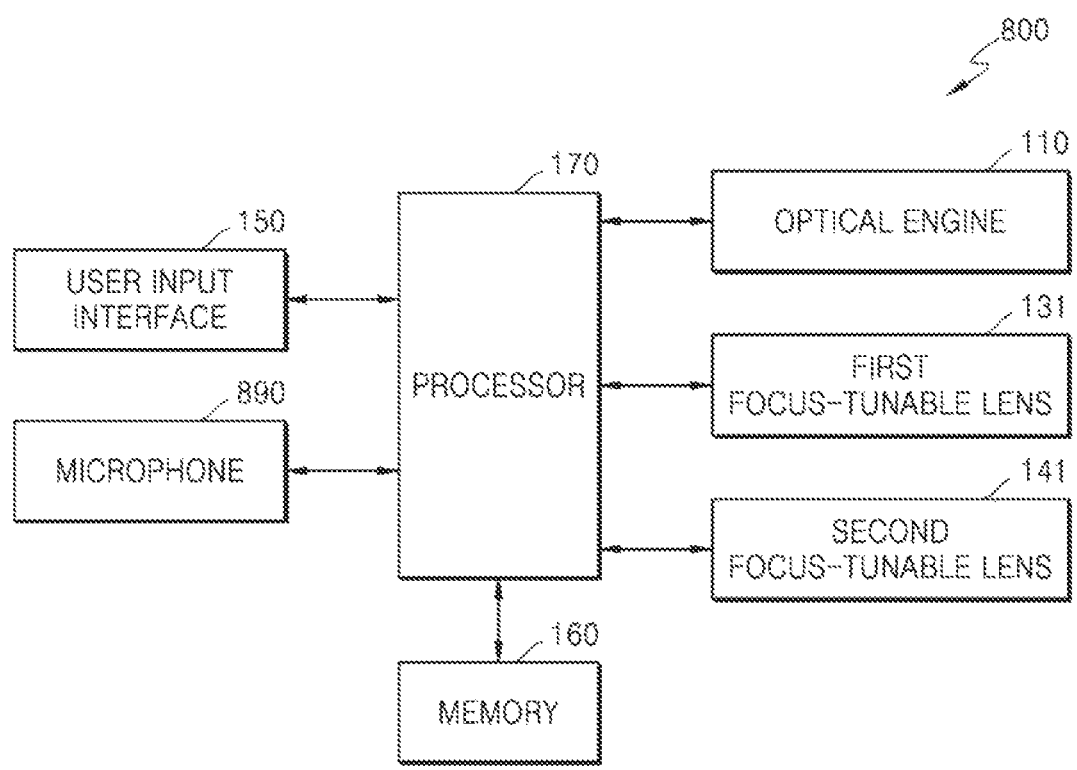
FIG. 20 is a block diagram of an AR device according to an embodiment.

FIG. 20 is a block diagram of an AR device 800 according to an embodiment.

Referring to FIG. 20, the AR device 800 may include the user input unit 150, the memory 160, the processor 170, and a microphone 890, together with an optical system including the optical engine 110, the first focus-tunable lens 131, and the second focus-tunable lens 141. Among components shown in FIG. 20, a component having the same reference numeral as that of a component shown in FIG. 4 is the same as the component shown in FIG. 4, and thus will not be described redundantly.

The microphone 890 may receive an external audio signal and process the received audio signal into electric voice data. For example, the microphone 890 may receive an audio signal from an external device or a speaker. The microphone 890 may use various noise cancellation algorithms for canceling noise generated during reception of the external audio signal. The microphone 890 may receive a voice input of the user to control the AR device 800. The microphone 890 may receive a voice input of the user who reads a character (602 of FIG. 13) displayed through the AR device 800.

Figure 21:
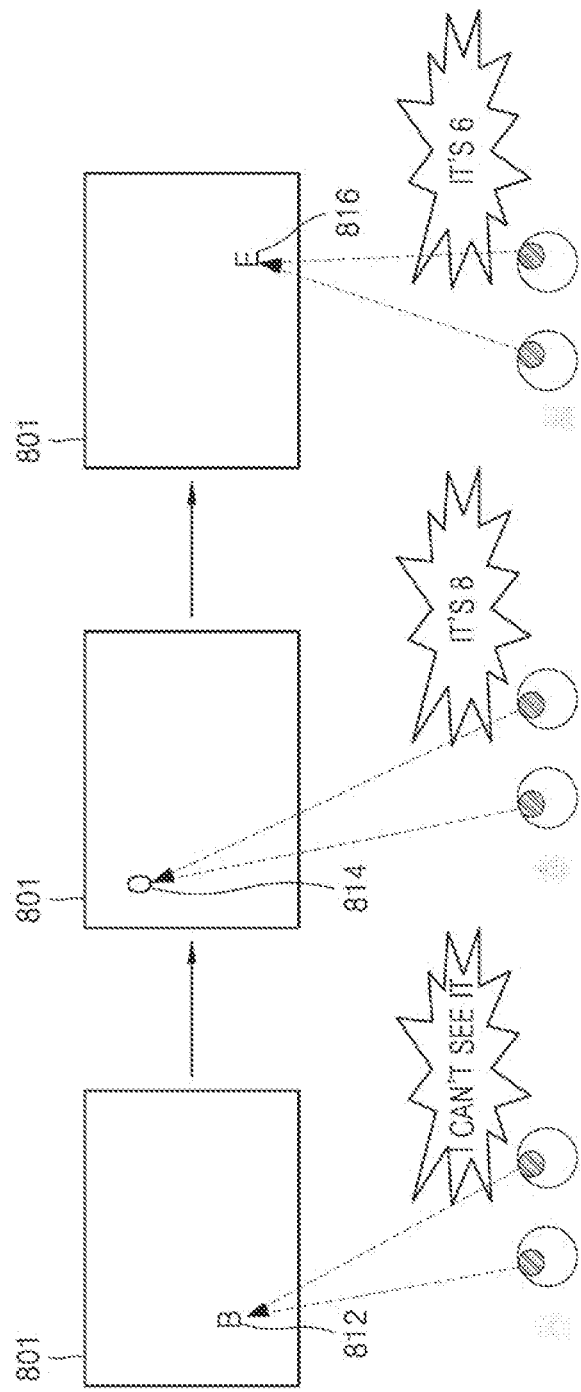
FIG. 21 illustrates an example where an AR device according to an embodiment performs an operation to obtain a correction-required refractive power of a user when a correct answer rate of a voice input of the user is low.
Figure 22:
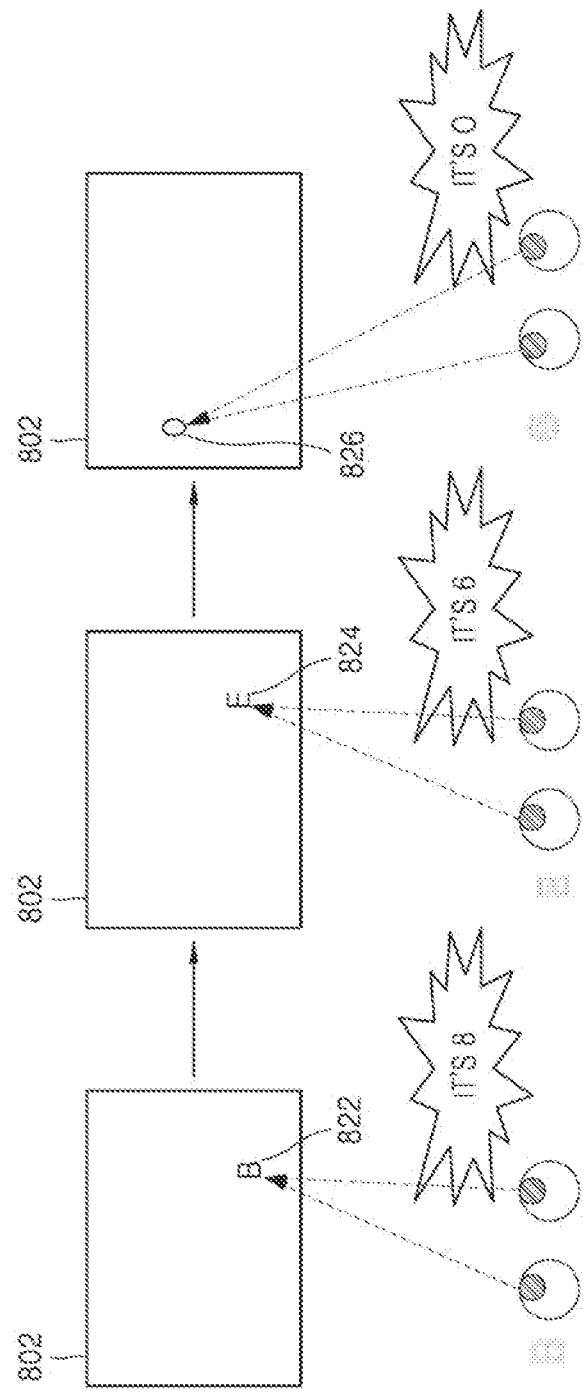
FIG. 22 illustrates an example where an AR device according to an embodiment performs an operation to obtain the correction-required refractive power of the user when the correct answer rate of the voice input of the user is normal.
Figure 23:
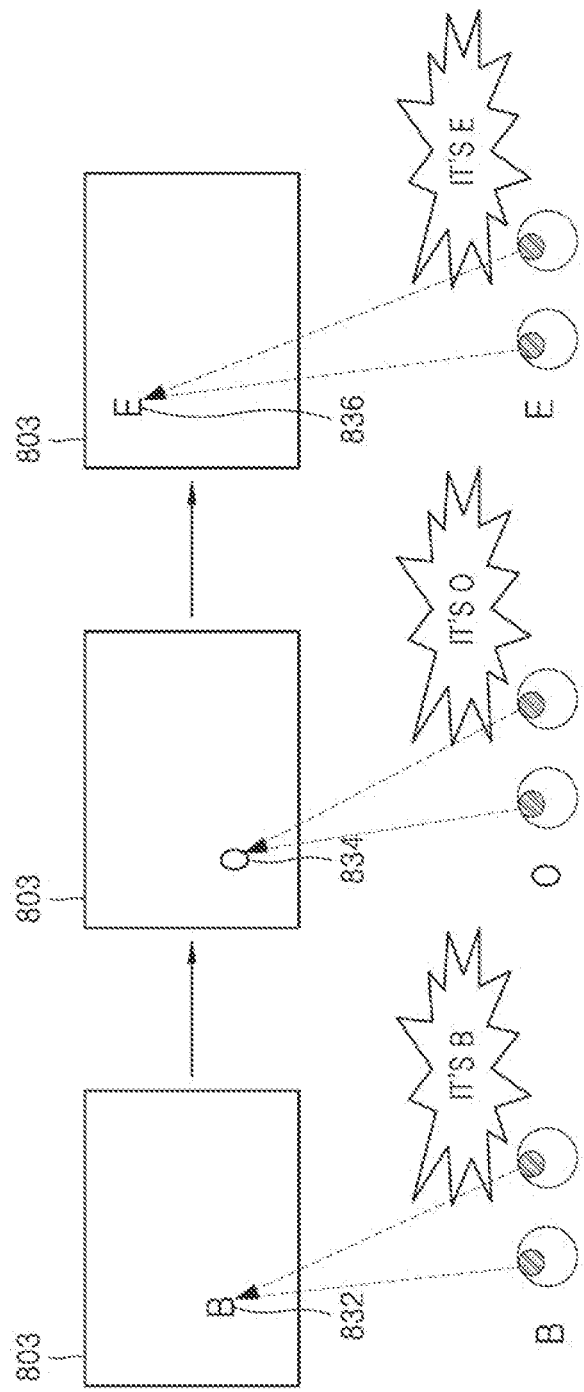
FIG. 23 illustrates an example where an AR device according to an embodiment performs an operation to obtain the correction-required refractive power of the user when the correct answer rate of the voice input of the user is high.

Referring to FIGS. 21 through 23, an example of a detailed operation for obtaining a correction-required refractive power of the user will be described.

FIG. 21 illustrates an example where the AR device 800 according to an embodiment of the disclosure performs an operation to obtain a correction-required refractive power of a user when a correct answer rate of a voice input of the user is low.

Referring to FIG. 21, the AR device 800 may sequentially display characters of a certain size at a focal distance for vision measurement, and receive a voice input of the user with respect to the displayed characters. For example, the AR device 800 may sequentially display a character B 812, a character O 814, and a character E 816 in different positions on a virtual vision measurement board 801 displayed at the focal distance for vision measurement. In this case, the character B 812, the character O 814, and the character E 816 displayed on a vision measurement board 801 may be excessively blurredly shown to a user having poor vision, as shown in FIG. 21. Thus, the AR device 800 may display the character B 812 and then receive the voice input of the user, "I can't see it". Thereafter, the AR device

800 may display the character O 814 and then receive the voice input of the user, "It's 8". Thereafter, the AR device 800 may also display the character E 816 and then receive the voice input of the user, "It's 6".

The AR device 800 may identify the voice input "I can't see it", compare the character O with the character 8, and compare the character E with the character 6. The AR device 800 may also identify a correct answer rate of the voice input of the user as 0% based on comparison results, and change the refractive power of the first focus-tunable lens 131 from 0D to −2D.

FIG. 22 illustrates an example where the AR device 800 according to an embodiment of the disclosure performs an operation to obtain a correction-required refractive power of a user when a correct answer rate of a voice input of the user is normal.

Referring to FIG. 22, the AR device 800 may sequentially display characters of a certain size at a focal distance for vision measurement, and receive a voice input of the user with respect to the displayed characters, after the refractive power of the first focus-tunable lens 131 changes to '−2D'. For example, the AR device 800 may sequentially display a character B 822, a character E 824, and a character O 826 in different positions on a virtual vision measurement board 802 displayed at the focal distance for vision measurement. In this case, the vision measurement board 802 may be the same as the vision measurement board 801. The character B 822, the character E 824, and the character O 826 displayed on the vision measurement board 802 may be moderately blurredly shown to the user, as shown in FIG. 22. Thus, the AR device 800 may display the character B 822 and then receive the voice input of the user, "It's 8". Thereafter, the AR device 800 may display the character E 824 and then receive the voice input of the user, "It's 6". Thereafter, the AR device 800 may also display the character O 826 and then receive the voice input of the user, "It's O".

The AR device 800 may compare the character B with the voice input 8 and compare the character E with the voice input O. The AR device 800 may also identify the correct answer rate of the voice input of the user as 33.3% based on comparison results, and change the refractive power of the first focus-tunable lens 131 from −2D to −3D.

FIG. 23 illustrates an example where the AR device 800 according to an embodiment of the disclosure performs an operation to obtain a correction-required refractive power of a user when a correct answer rate of a voice input of the user is high.

Referring to FIG. 23, the AR device 800 may sequentially display characters of a certain size at a focal distance for vision measurement, and receive a voice input of the user with respect to the displayed characters, after the refractive power of the first focus-tunable lens 131 changes to '−3D', as shown in FIG. 22. For example, the AR device 800 may sequentially display a character B 832, a character O 834, and a character E 836 in different positions on a virtual vision measurement board 803 displayed at the focal distance for vision measurement. In this case, the vision measurement board 803 may be the same as the vision measurement board 801. The character B 832, the character O 834, and the character E 836 displayed on the vision measurement board 803 may be clearly shown to the user, as shown in FIG. 23. The AR device 800 may display the character B 832 and then receive the voice input of the user, "It's B". Thereafter, the AR device 800 may also display the character O 834 and then receive the voice input of the user, "It's O". Thereafter, the AR device 800 may also display the character E 836 and then receive the voice input of the user, "It's E".

The AR device 800 may compare the character B with the voice input B, compare the character O with the voice input O, and compare the character E with the voice input E. In addition, the AR device 800 may also identify the correct answer rate of the voice input of the user as 100% based on comparison results, and convert the correction-required refractive power $D_{correction}$ of the user or the modified correction-required refractive power $D_{modified}$ from the current refractive power (i.e., the first refractive power) of the first focus-tunable lens 131, using Equations 11 and 12 provided below.

$$D_{correction} = D_{1C} + D_{fixed} + \frac{1}{f} \quad \text{[Equation 11]}$$

$$D_{modified} = -D_{fixed} + D_{correction} = D_{1C} + \frac{1}{f} \quad \text{[Equation 12]}$$

$D_{1C}$ indicates the current refractive power of the first focus-tunable lens 131, and f indicates a focal distance of the virtual image and, in the embodiment, a distance from the eye of the user to the vision measurement boards 801, 802, and 803.

The user's correction-required refractive power $D_{correction}$ or the modified correction-required refractive power $D_{modified}$ determined as described above may be stored in the memory 160 to calculate the first refractive power of the first focus-tunable lens 131 and the second refractive power of the second focus-tunable lens 141.

Although it is described with reference to FIGS. 21 through 23 that after three characters are sequentially displayed and corresponding voice inputs of the user are received, the refractive power of the first focus-tunable lens 131 is additionally changed, the number of displayed characters is not limited thereto. For example, after the AR device 800 may display one character and receive a corresponding voice input of the user, the AR device 800 may determine whether the user's voice input is correct. When the user inputs a wrong answer, the AR device 800 may change the refractive power of the first focus-tunable lens 131.

The refractive power of the first focus-tunable lens 131 may be changed differently from a change level of the refractive power in FIGS. 21 and 22. In this case, a change level of the refractive power of the first focus-tunable lens 131 may be set variously based on the correct answer rate of the user. For example, for a low correct answer rate of the user, the AR device 800 may reduce the number of times the refractive power is changed to correct the user's vision, by changing the refractive power of the first focus-tunable lens 131 many times. For example, for a high correct answer rate of the user, the AR device 800 may minutely change the user's vision by changing the refractive power of the first focus-tunable lens 131 a small number of times.

Figure 24:
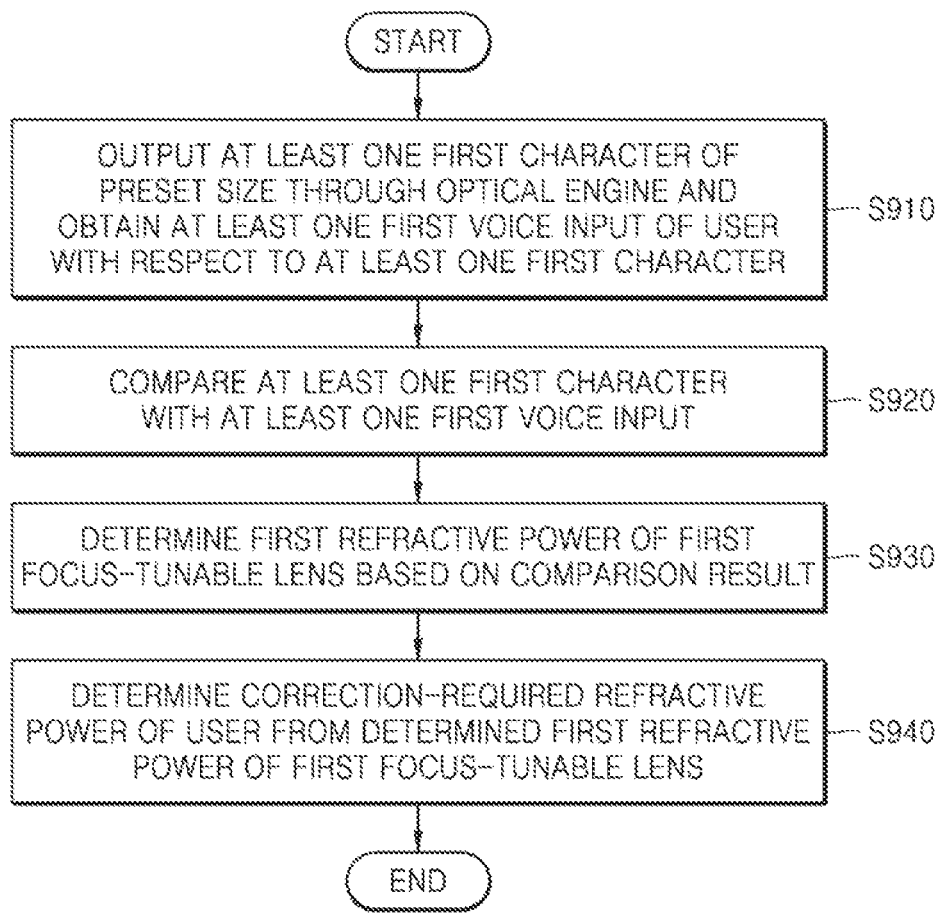
FIG. 24 is a flowchart for describing an operation of an AR device according to an embodiment.

FIG. 24 is a flowchart for describing an operation of the AR device 800 according to an embodiment.

Referring to FIG. 24, for an operation of obtaining the correction-required refractive power of the user, at least one first character of a preset size may be output on the virtual vision measurement board 801 displayed at a focal distance for vision measurement through the optical engine 110 and at least one first voice input of the user with respect to the at least one first character may be obtained, in operation S910. Next, the at least one first character and the at least one first voice input may be compared with each other, in operation S920. Next, the first refractive power of the first focus-tunable lens 131 may be determined based on a comparison result, in operation S930. As in Equation 11 described above, the user's correction-required refractive power $D_{correction}$ may be determined based on the determined first refractive power of the first focus-tunable lens 131, in operation S940. As in Equation 12 described above, the modified correction-required refractive power $D_{modified}$ may be determined based on the determined first refractive power of the first focus-tunable lens 131.

While the voice input of the user is received through the microphone 890 in the embodiment described with reference to FIGS. 20 through 24, embodiments are not limited thereto. For example, the AR device 800 may receive information about user's reading of a character through a user's touch input, etc., with the user input interface 150.

An embodiment may be implemented using a recording medium including a computer-executable command such as a computer-executable programming module. A computer-readable recording medium may be an available medium that is accessible by a computer, and includes all of a volatile medium, a non-volatile medium, a separated medium, and a non-separated medium. The computer-readable recording medium may also include a computer storage medium and a communication medium. The computer storage medium includes all of a volatile medium, a non-volatile medium, a separated medium, and a non-separated medium, which is implemented by a method or technique for storing information such as a computer-readable instruction, a data structure, a programming module, or other data. A communication medium may typically include a computer-readable instruction, a data structure, or other data of a modulated data signal such as a programming module.

The computer-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium. For example, the 'non-transitory storage medium' may include a buffer in which data is temporarily stored.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. When distributed online, at least a part of the computer program product (e.g., a downloadable app) may be temporarily generated or at least temporarily stored in the machine-readable storage medium, such as memory of the manufacturer's server, a server of the application store, or a relay server.

In the specification, the term "unit" may be a hardware component like a processor or a circuit, and/or a software component executed by a hardware component like a processor.

Those of ordinary skill in the art to which the disclosure pertains will appreciate that the disclosure may be implemented in different detailed ways without departing from the technical spirit or essential characteristics of the disclosure. Accordingly, the aforementioned embodiments of the disclosure should be construed as being only illustrative, and should not be constructed as being restrictive from all aspects. For example, each element described as a single type may be implemented in a distributed manner, and likewise, elements described as being distributed may be implemented as a coupled type.

According to embodiments of the disclosure, a device and method of displaying AR may provide a self-vision correction function.

According to embodiments of the disclosure, a device and method of displaying AR may provide an immersive AR environment by moving a focal distance of a virtual image to a random position where a real object is located.

According to embodiments the disclosure, a device and method of displaying AR may improve the qualities of the virtual image and a real scene by reducing a refractive power required level of a focus-tunable lens.

While the device and method of displaying AR according to embodiments of the disclosure has been shown and described in connection with the embodiments to help understanding of the disclosure, it will be apparent to those of ordinary skill in the art that modifications and variations may be made. Therefore, the true technical scope of the disclosure should be defined by the appended claims and their equivalents.

What is claimed is:

1. A device for displaying augmented reality (AR), the device comprising:
   an optical engine configured to output light of a virtual image;
   a waveguide configured to output the light of the virtual image received from the optical engine and transmit light of a real scene;
   a first lens part provided on a first surface of the waveguide;
   a second lens part provided on a second surface of the waveguide opposite to the first surface; and
   a processor,
   wherein the first lens part is configured to tune a focus of the virtual image and correct a vision of a user, the first lens part comprising a first focus-tunable lens having a first refractive power that is tunable by the processor and a fixed refractive lens having a fixed refractive power,
   wherein the second lens part is configured to compensate distortion of the real scene caused by the first lens part, and the second lens part comprising a second focus-tunable lens having a second refractive power that is tunable by the processor,
   wherein the processor is further configured to determine the first refractive power of the first focus-tunable lens to satisfy $$D_1 = -D_{fixed} + D_{correction} - \frac{1}{f},$$

where $D_1$ indicates the first refractive power of the first focus-tunable lens, $D_{fixed}$ indicates a fixed refractive power of the fixed refractive lens, $D_{correction}$ indicates a correction-required refractive power for correcting ametropia of the user, and f indicates a focal distance of the virtual image, and wherein the processor is further configured to adjust the first refractive power $D_1$ of the first focus-tunable lens such that the focal distance of the virtual image is an attribute distance of the virtual image.

2. The device of claim 1, further comprising a memory configured to store the fixed refractive power $D_{fixed}$ of the fixed refractive lens, the correction-required refractive power $D_{correction}$ of the user, and the focal distance f of the virtual image, wherein the processor is further configured to read the fixed refractive power of the fixed refractive lens, the correction-required refractive power of the user, and the focal distance of the virtual image from the memory and obtain the first refractive power $D_1$ of the first focus-tunable lens as $$-D_{fixed} + D_{correction} - \frac{1}{f}.$$

3. The device of claim 1, further comprising a memory configured to store the focal distance f of the virtual image and a modified correction-required refractive power $D_{modified}$ in which the fixed refractive power of the fixed refractive lens is reflected, wherein the modified correction-required refractive power $D_{modified}$ satisfies $D_{modified} = -D_{fixed} + D_{correction}$, and wherein the processor is further configured to read the modified correction-required refractive power and the focal distance of the virtual image from the memory and obtain the first refractive power $D_1$ of the first focus-tunable lens as $$D_{modified} - \frac{1}{f}.$$

4. The device of claim 1, wherein a second refractive power $D_2$ of the second focus-tunable lens satisfies $$D_2 = \frac{1}{f}.$$

where f indicates the focal distance of the virtual image.

5. The device of claim 1, wherein the fixed refractive lens is a concave lens having a negative (−) refractive power.

6. The device of claim 1, wherein the first focus-tunable lens and the second focus-tunable lens are liquid crystal lenses.

7. The device of claim 1, wherein the first focus-tunable lens is provided between the waveguide and the fixed refractive lens, and wherein the first focus-tunable lens, the waveguide, and the second focus-tunable lens have a stack structure.

8. The device of claim 1, further comprising a user input interface configured to receive at least any one of vision information of the user or the focal distance of the virtual image based on a user input.

9. The device of claim 1, wherein the first lens part further comprises a polarization plate provided on an incident surface of the fixed refractive lens or an emission surface of the fixed refractive lens.

10. The device of claim 1, wherein the second lens part further comprises a second fixed refractive lens configured to compensate distortion of the real scene caused by the first lens part and the second focus-tunable lens.

11. The device of claim 10, wherein the second fixed refractive lens is a convex lens having a positive (+) refractive power.

12. The device of claim 10, wherein the second refractive power D2 of the second focus-tunable lens satisfies $$D_2 = \frac{1}{f} - D_{fixed2},$$

where $D_{fixed2}$ indicates a fixed refractive power of the second fixed refractive lens, and f indicates the focal distance of the virtual image.

13. The device of claim 1, further comprising a gaze tracking sensor configured to obtain gaze information of the user.

14. The device of claim 13, wherein the processor is further configured to:
obtain a gaze point from the gaze information of the user obtained by the gaze tracking sensor; and
determine the focal distance of the virtual image based on the obtained gaze point.

15. The device of claim 1, wherein the processor is further configured to:
control the optical engine to output at least one first character of a preset size;
obtain at least one first user input with respect to the at least one first character;
compare the at least one first character with the at least one first user input;
determine the first refractive power of the first focus-tunable lens based on a result of the comparing; and
determine the correction-required refractive power of the user based on the determined first refractive power of the first focus-tunable lens.

16. The device of claim 15, wherein the at least one first character and at least one second character have sizes corresponding to preset corrected vision, and
wherein the at least one first character and the at least one second character are displayed to a preset depth for vision measurement of the user.

17. The device of claim 1, wherein the device is a glasses-type device.

18. A method of displaying augmented reality (AR) in an AR device that comprises an optical engine configured to output light of a virtual image, a waveguide configured to output the light of the virtual image and transmit light of a real scene, the method comprising:
providing a first lens part comprising a fixed refractive lens and a first focus-tunable lens and a second lens part comprising a second focus-tunable lens on opposite surfaces of the waveguide;
reading a fixed refractive power $D_{fixed}$ of the fixed refractive lens, a correction-required refractive power $D_{correction}$ for correcting ametropia of a user, and a focal distance f of the virtual image from a memory;
obtaining a first refractive power $D_1$ of the first focus-tunable lens satisfying $$D1 = -D_{fixed} + D_{correction} - \frac{1}{f}.$$

and
obtaining a second refractive power of the second focus-tunable lens to compensate for distortion of the real scene caused by the first lens part; and adjusting the first refractive power $D_1$ of the first focus-tunable lens such that the focal distance of the virtual image is an attribute distance of the virtual image.

* * * * *